(12) United States Patent
Kim et al.

(10) Patent No.: US 12,712,392 B2
(45) Date of Patent: Aug. 18, 2026

(54) WIRELESS POWER TRANSMISSION DEVICE AND OPERATING METHOD OF WIRELESS POWER TRANSMITTER

(71) Applicant: Samsung Electronics Co., Ltd., Suwon-si (KR)

(72) Inventors: Hyunsu Kim, Suwon-si (KR); Inyeong Jang, Hwaseong-si (KR); Donghyuk Choi, Yongin-si (KR); Sungwoo Moon, Seongnam-si (KR); Youso Cheon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 700 days.

(21) Appl. No.: 17/982,855

(22) Filed: Nov. 8, 2022

(65) Prior Publication Data

US 2023/0163635 A1 May 25, 2023

(30) Foreign Application Priority Data

Nov. 19, 2021 (KR) ........................ 10-2021-0160718
Jan. 20, 2022 (KR) ........................ 10-2022-0008693
Mar. 15, 2022 (KR) ........................ 10-2022-0032236

(51) Int. Cl.
*H02J 50/12* (2016.01)
*H02J 50/60* (2016.01)
*H02J 50/80* (2016.01)

(52) U.S. Cl.
CPC .............. *H02J 50/12* (2016.02); *H02J 50/60* (2016.02); *H02J 50/80* (2016.02)

(58) Field of Classification Search
CPC ............. H02J 50/12; H02J 50/60; H02J 50/80
See application file for complete search history.

(56) References Cited

U.S. PATENT DOCUMENTS 9,467,205 B2 * 10/2016 Nakano .................... H02J 50/12
9,530,558 B2 12/2016 Nakano et al.
(Continued)

FOREIGN PATENT DOCUMENTS

CN 106663966 A * 5/2017 .............. H02J 50/12
EP 3506460 A1 7/2019
(Continued)

OTHER PUBLICATIONS

Extended European Search Report dated Mar. 23, 2023 issued in corresponding European Appln. No. 22208227.3.
(Continued)

*Primary Examiner* — Jared Fureman
(74) *Attorney, Agent, or Firm* — Fish & Richardson P.C.

(57) ABSTRACT

A wireless power transmission device includes a converter circuit configured to generate a test signal having a test frequency based on an input current generated from a power source, a resonant tank configured to transmit wireless power in response to the test signal, a current sensing circuit configured to sense the input current when the wireless power is transmitted, and a controller configured to control the converter circuit to generate a test signal, calculate a quality factor of the resonant tank based on the sensed input current, reset the test frequency according to a comparison result between the quality factor and a stored reference quality factor, and control the converter circuit to reset the test frequency or transmit a digital ping signal to the wireless power reception device according to a result of comparing the quality factor with the stored reference quality factor.

20 Claims, 29 Drawing Sheets

(56) References Cited

U.S. PATENT DOCUMENTS

| | | | | |
|---|---|---|---|---|
| 9,762,092 | B2 | 9/2017 | Jung et al. | |
| 10,291,078 | B2 * | 5/2019 | Watanabe | H04B 5/79 |
| 10,862,348 | B2 * | 12/2020 | Park | H02J 50/90 |
| 10,971,955 | B2 * | 4/2021 | Kim | H02J 50/60 |
| 11,031,829 | B2 * | 6/2021 | Park | H02J 50/80 |
| 11,038,382 | B2 * | 6/2021 | Park | H02J 50/12 |
| 11,159,062 | B2 | 10/2021 | Bhandarkar et al. | |
| 11,848,572 | B2 * | 12/2023 | Kim | H02J 50/12 |
| 11,984,736 | B2 * | 5/2024 | Muratov | H02J 50/60 |
| 12,074,456 | B2 * | 8/2024 | Iwase | H02J 7/00034 |
| 12,170,449 | B2 * | 12/2024 | Kim | H02J 50/90 |
| 12,230,978 | B2 * | 2/2025 | Hiramatsu | H02J 50/60 |
| 2018/0115197 | A1 | 4/2018 | Li et al. | |
| 2019/0319494 | A1 | 10/2019 | Park et al. | |
| 2019/0326782 | A1 * | 10/2019 | Graham | H02J 50/12 |
| 2020/0212713 | A1 | 7/2020 | Jiang et al. | |
| 2020/0212725 | A1 | 7/2020 | Van Wageningen et al. | |
| 2020/0235612 | A1 * | 7/2020 | Muratov | H02J 50/10 |
| 2021/0175728 | A1 * | 6/2021 | Wang | H02J 7/04 |
| 2021/0273492 | A1 * | 9/2021 | Sherman | H02J 50/80 |
| 2023/0299621 | A1 * | 9/2023 | Wu | H02J 50/60 320/108 |

FOREIGN PATENT DOCUMENTS

| | | | | |
|---|---|---|---|---|
| KR | 20140060866 | A * | 5/2014 | H02J 50/90 |
| KR | 2018/0010796 | A | 1/2018 | |
| KR | 10-1965205 | B1 | 4/2019 | |
| KR | 102074475 | B1 | 2/2020 | |
| WO | WO-2021/0159764 | A1 | 8/2021 | |

OTHER PUBLICATIONS

Qi Specification, 'Foreign Object Detection' Wireless Power Consortium, Version 1.3, Jan. 2021.

Vladmir Muratov, 'Methods for Foreign Object Detection in Inductive Wireless Charging' Qi Developer Forum, Nov. 2017.

P9242-R Datasheet 'Wireless Power Transmitter for 15W Applications' Renesas Electronics Corporation, Jan. 2018.

'WCT1012 15W Single Coil TX V3.1 Reference Design System User's Guide' NXP Semiconductors, Feb. 2017.

Xun Liu et al., 'Optimal Operation of Contactless Transformers with Resonance in Secondary Circuits' IEEE, 2008.

The Qi Wireless Power Transfer System Power Class 0 Specification Part1 and 2 : Interface Definitions, Wireless Power Consortium.

"Audio/video, information and communication technology equipment—Part 1: Safety requirements" International Standard, IEC 62368-1, Edition 3.0, Oct. 2018, pp. 1-780.

Office Action in Korean Appln. No. 10-2022-0032236, mailed on Mar. 24, 2026, 10 pages (with English translation).

* cited by examiner

Figure 1:
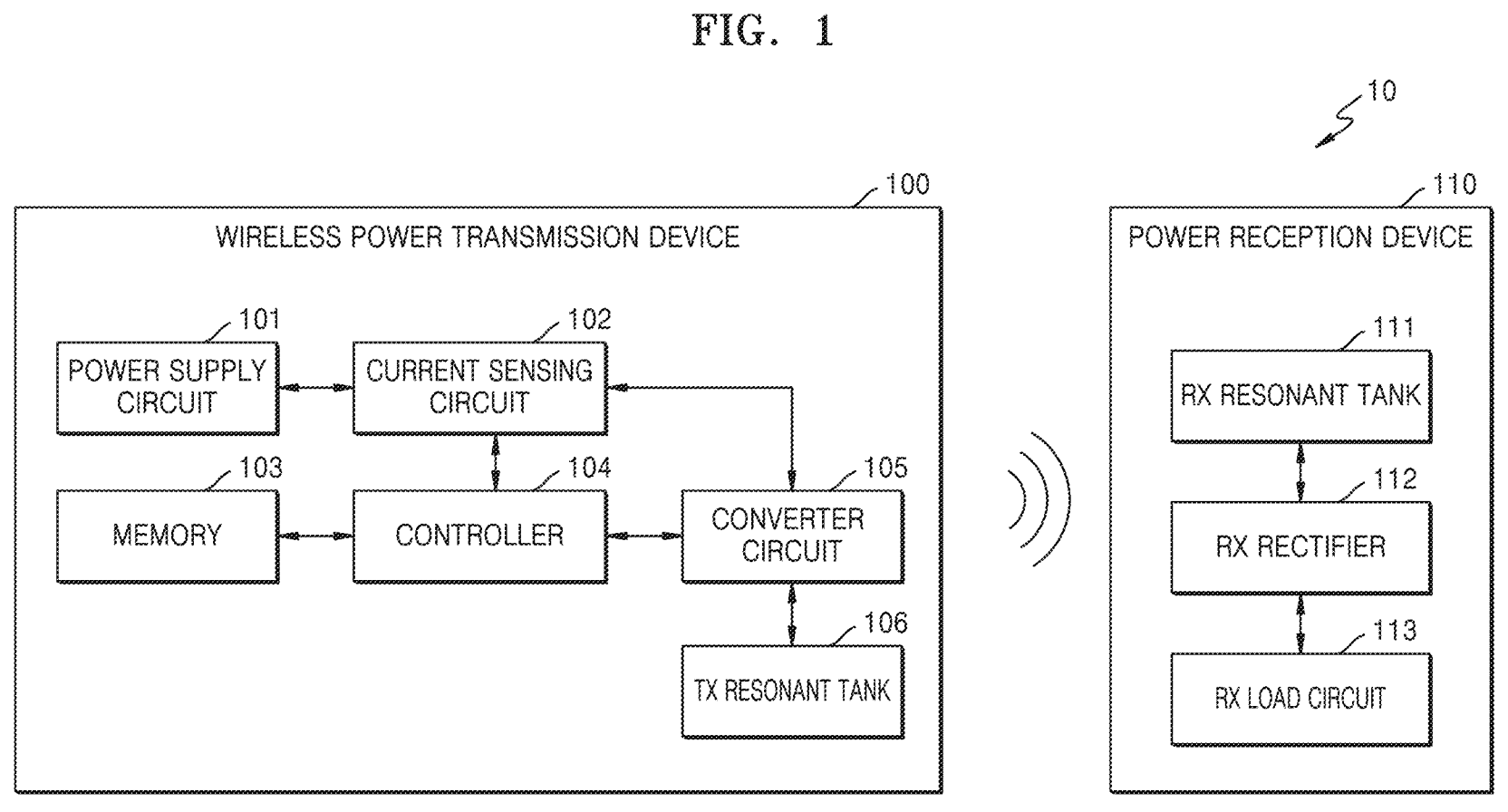

110
POWER RECEPTION DEVICE
111
RX RESONANT TANK
112
RX RECTIFIER
113
RX LOAD CIRCUIT

100
WIRELESS POWER TRANSMISSION DEVICE
101
POWER SUPPLY CIRCUIT
102
CURRENT SENSING CIRCUIT
103
MEMORY
104
CONTROLLER
105
CONVERTER CIRCUIT
106
TX RESONANT TANK

360
CP
LP
RP
IC_TX
350
TR1
N3
TR3
N2
TR2
N4
TR4
IBRG
CD
S1
S2
S3
S4
330
340
CONTROLLER
MEMORY
Finit
Fstep
Dt
Qth
Fend
Frange
Fdgn
BWdgn
BRGtyp
320
STR
AMP
IIN
N1
SC
310

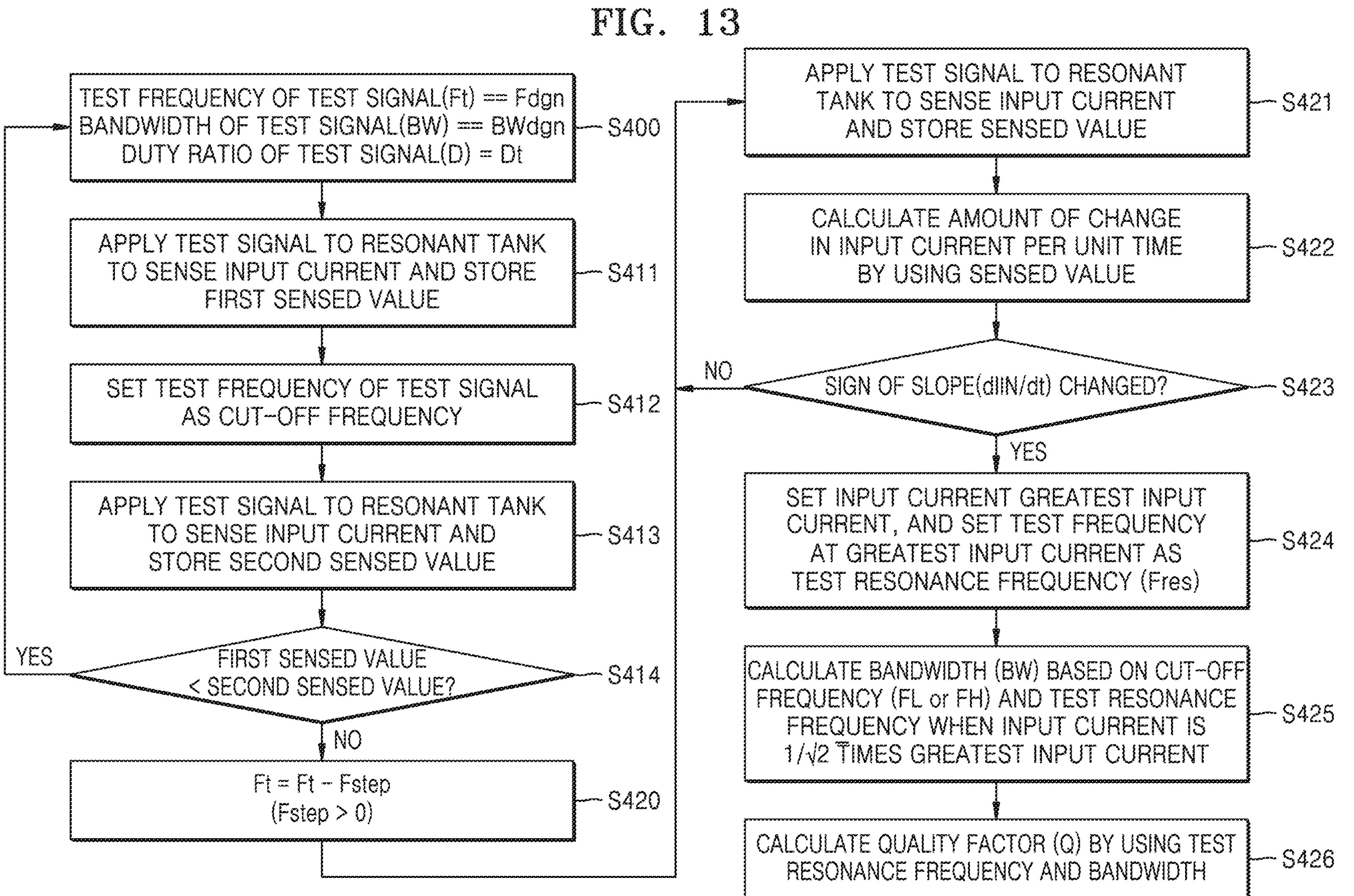
FIG. 13
TEST FREQUENCY OF TEST SIGNAL(Ft) == Fdgn
BANDWIDTH OF TEST SIGNAL(BW) == BWdgn
DUTY RATIO OF TEST SIGNAL(D) = Dt
S400
APPLY TEST SIGNAL TO RESONANT TANK TO SENSE INPUT CURRENT AND STORE FIRST SENSED VALUE
S411
SET TEST FREQUENCY OF TEST SIGNAL AS CUT-OFF FREQUENCY
S412
APPLY TEST SIGNAL TO RESONANT TANK TO SENSE INPUT CURRENT AND STORE SECOND SENSED VALUE
S413
FIRST SENSED VALUE < SECOND SENSED VALUE?
S414
YES
NO
Ft = Ft − Fstep
(Fstep > 0)
S420
APPLY TEST SIGNAL TO RESONANT TANK TO SENSE INPUT CURRENT AND STORE SENSED VALUE
S421
CALCULATE AMOUNT OF CHANGE IN INPUT CURRENT PER UNIT TIME BY USING SENSED VALUE
S422
SIGN OF SLOPE(dIIN/dt) CHANGED?
S423
NO
YES
SET INPUT CURRENT GREATEST INPUT CURRENT, AND SET TEST FREQUENCY AT GREATEST INPUT CURRENT AS TEST RESONANCE FREQUENCY (Fres)
S424
CALCULATE BANDWIDTH (BW) BASED ON CUT-OFF FREQUENCY (FL or FH) AND TEST RESONANCE FREQUENCY WHEN INPUT CURRENT IS 1/√2 TIMES GREATEST INPUT CURRENT
S425
CALCULATE QUALITY FACTOR (Q) BY USING TEST RESONANCE FREQUENCY AND BANDWIDTH
S426

WIRELESS POWER TRANSMISSION DEVICE AND OPERATING METHOD OF WIRELESS POWER TRANSMITTER

CROSS-REFERENCE TO RELATED APPLICATIONS

This application claims priority under 35 U.S.C. § 119 to Korean Patent Application No. 10-2021-0160718, filed on Nov. 19, 2021, Korean Patent Application No. 10-2022-0008693, filed on Jan. 20, 2022, and Korean Patent Application No. 10-2022-0032236, filed on Mar. 15, 2022, in the Korean Intellectual Property Office, the disclosures of which are incorporated by reference herein in their entireties.

FIELD

The inventive concepts relate to an electronic device, and more particularly, to a wireless power transmission device and a method of operating a wireless power transmitter.

BACKGROUND

Wireless charging means that power is transferred between a transmitter that transmit wireless power and a receiver. If a user puts a foreign object made of metal, such as a coin or a key, near the transmitter, the foreign object may absorb power from the magnetic field, so an accident due to heat may occur. Accordingly, to inhibit or prevent heat generation due to foreign objects in a wireless charging system, it is desirable or necessary to detect foreign objects. In addition, when a foreign object is detected, it is desirable or necessary to lower the power delivery level or stop the power delivery.

SUMMARY

The inventive concepts provide a wireless power transmission device that implements a test signal for detecting a foreign object without adding additional hardware and a method of operating a wireless power transmitter.

In addition, the inventive concepts provide a wireless power transmission device for quickly and accurately detecting a foreign object and a method of operating a wireless power transmitter.

According to an aspect of the inventive concepts, a wireless power transmission device for supplying wireless power to a wireless power reception device includes a converter circuit configured to generate a test signal, the test signal having a test frequency based on an input current generated from a power source, a resonant tank configured to transmit wireless power in response to the test signal, a current sensing circuit configured to sense the input current when the wireless power is transmitted, and a controller configured to control the converter circuit to generate the test signal, calculate a quality factor of the resonant tank based on the sensed input current, compare the quality factor with a stored reference quality factor, and control the converter circuit to reset the test frequency or transmit a digital ping signal to the wireless power reception device according to a result of comparing the quality factor with the stored reference quality factor.

According to another aspect of the inventive concepts, a wireless power transmission device for supplying power to the wireless power reception device includes a power source connected between a first node and ground, a current sensing circuit connected between the first node and a second node, a converter circuit including a first transistor connected between the second node and a third node, a second transistor connected between the second node and a fourth node, a third transistor connected between the third node and the ground, and a fourth transistor connected between the fourth node and the ground, a resonant tank connected between the third node and the fourth node, and a controller connected to an output terminal of the current sensing circuit and connected to a gate electrode of each of the first to fourth transistors, wherein the controller is configured to output a first switching signal to the gate electrode of the first transistor, output a second switching signal to the gate electrode of the second transistor, output a third switching signal to the gate electrode of the third transistor, and output a fourth switching signal to the gate electrode of the fourth transistor, wherein at least one signal group of a first signal group including the first and third switching signals and a second signal group including the second and fourth switching signals is a square wave having a test frequency and a test duty ratio, and wherein a phase difference between two switching signals included in the at least one signal group is 180 degrees.

According to another aspect of the inventive concepts, an operating method of a wireless power transmitter for controlling a resonant tank includes setting a test frequency of a test signal applied to the resonant tank, calculating a quality factor of the resonant tank by applying the test signal to the resonant tank, comparing the quality factor with a stored reference quality factor, and resetting the test frequency or performing an operation of wirelessly transmitting power according to a result of comparing the quality factor with the stored reference quality factor.

According to another aspect of the inventive concepts, an operating method of a wireless power transmitter for controlling a resonant tank includes sensing an input current to the resonant tank by applying a test signal to the resonant tank, setting a test resonance frequency based on the sensed value of the input current, calculating a quality factor based on the sensed value and the test resonance frequency; comparing the quality factor with a reference quality factor selected according to the test resonance frequency among a plurality of specified reference quality factors, and resetting the test signal or performing an operation of wirelessly transmitting power according to a result of comparing the quality factor with the reference quality factor.

BRIEF DESCRIPTION OF THE DRAWINGS

Some example embodiments of the inventive concepts will be more clearly understood from the following detailed description taken in conjunction with the accompanying drawings in which:

FIG. 1 is a view for explaining a wireless power transmission/reception system according to an example embodiment of the present inventive concepts;

FIG. 13 is a flowchart for explaining another example embodiment of calculating a quality factor;

DETAILED DESCRIPTION

Figure 2A:
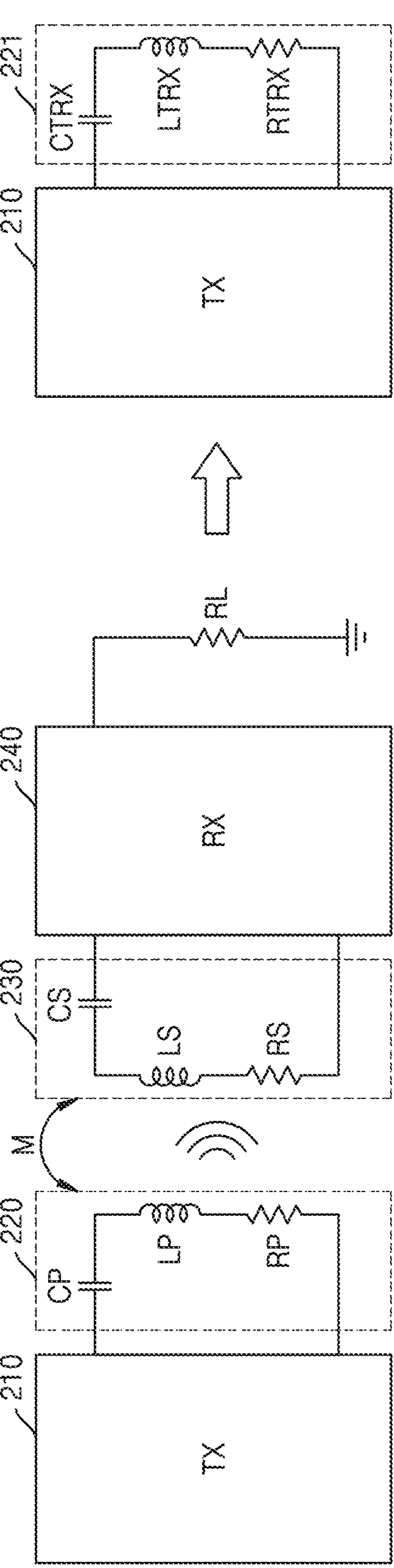
FIGS. 2A and 2B are schematic equivalent circuit diagrams of a resonant tank included in a wireless power transmission device.

Hereinafter, some example embodiments of the present inventive concepts will be described in detail with reference to the accompanying drawings.

FIG. 1 is a diagram for explaining a wireless power transmission/reception system according to an example embodiment of the present inventive concepts.

Referring to FIG. 1, a wireless power transmission/reception system 10 may include a wireless power transmission device 100 and a wireless power reception device 110.

The wireless power transmission device 100 may supply wireless power to the wireless power reception device 110.

The wireless power transmission device 100 may provide wireless power to the wireless power reception device 110 through a contactless method. The contactless method may be, for example, a wireless charging standard (e.g., Alliance for Wireless Power (A4WP)) that follows separate short-range wireless communication. However, the inventive concepts are not limited thereto, and in another example embodiment, the contactless method may be a wireless charging standard (e.g., Wireless Power Consortium (WPC), Power Matters Alliance (PMA), and the like) that does not use separate short-range wireless communication.

The wireless power transmission device 100 may transmit wireless power and receive information data from the wireless power reception device 110 through a contactless method.

The wireless power transmission device 100 may include a power supply circuit 101, a current sensing circuit 102, a memory 103, a controller 104, a converter circuit 105, and a TX resonant tank 106.

The power supply circuit 101 may be a power supply for supplying power to the wireless power transmission device 100. In one example embodiment, the power supply circuit 101 may be implemented as a DC voltage source. In another example embodiment, the power supply circuit 101 may be implemented as a direct current source.

The current sensing circuit 102 may sense an input current generated by the power supply circuit 101 when wireless power is transmitted to the wireless power reception device 110. The current sensing circuit 102 may provide a sensed value corresponding to the sensed input current to the controller 104. The sensed value corresponding to the sensed input current may be, for example, a value corresponding to a DC component of the input current.

The memory 103 may store sensed values obtained by the current sensing circuit 102. The memory 103 may store data for wireless power transmission. Data for transmitting wireless power may include, for example, a duty ratio and frequency of a signal for transmitting wireless power. The memory 103 may store data for detecting a foreign object, and the data for detecting a foreign object will be described later with reference to FIG. 4. The memory 103 may be implemented as a volatile memory, such as dynamic random-access memory (RAM) (DRAM), static RAM (SRAM), or the like. However, the inventive concepts are not limited thereto, and the memory 103 may be implemented as a non-volatile memory. The memory 103 may be disposed outside the controller 104, but is not limited thereto and may be included in the controller 104.

The controller 104 may control the converter circuit 105 to transmit wireless power to the wireless power reception device 110. For example, the controller 104 may transmit a plurality of switching signals each having a turn-on level or a turn-off level to the converter circuit 105.

The controller 104 may detect a foreign object by using a quality factor of the TX resonant tank 106 as the test signal is transmitted to the TX resonant tank 106. In particular, the controller 104 may control the converter circuit 105 to generate a test signal. Then, the controller 104 may calculate the quality factor of the TX resonant tank 106 based on the input current sensed by the current sensing circuit 102. Then, the controller 104 may compare the quality factor with a pre-stored reference quality factor. The controller 104 may control the converter circuit 105 to reset the test frequency or transmit a digital ping signal to the wireless power reception device 110, according to the comparison result.

The test signal may be a voltage or current applied to the TX resonant tank 106. For example, the test signal may be a voltage (or a potential difference between both inputs) applied to the input of the TX resonant tank 106. For example, the test signal may be a current flowing through the input of the TX resonant tank 106. In an example embodiment, the test signal may be a square wave having a test duty ratio included in a range of a test frequency and a pre-stored duty ratio. However, the inventive concepts are not limited thereto. The test frequency and the test duty ratio may be set by the controller 104, respectively, and vary.

The quality factor of the TX resonant tank 106 may be referred to as "sharpness", "Q factor", "selectivity", "goodness", "quality coefficient", "quality factor", and the like.

The digital ping signal may be a signal transmitted from the wireless power transmission device 100 to the wireless power reception device 110 when a wireless power transmission operation is normally performed.

In some example embodiments, the controller 104 may control the converter circuit 105 to sequentially generate a signal having a frequency in a pre-stored frequency range as a test signal, sequentially store the sensed value corresponding to the sensed input current as the signal is sequentially generated, set the frequency as the test resonance frequency when the input current corresponding to the greatest value among the stored sensed values is sensed, calculate at least one cut-off frequency based on the stored sensed values, and calculate the quality factor based on the test resonance frequency and the at least one cut-off frequency. In particular, as an example embodiment for calculating the cut-off frequency is described, the controller 104 may set a frequency as the at least one cut-off frequency when an input current corresponding to at least one sensed value smaller by 3 dB (or more or less dB) than the greatest value (e.g., 3 dB less than the greatest value) among the stored sensed values is sensed. The description of the embodiment above will be given later in detail with reference to FIG. 9.

In another example embodiment, the controller 104 may control the converter circuit 105 to generate a signal having an initial frequency stored in advance (e.g., desired, pre-stored, predetermined, specified, etc.) as a test signal, store a sensed value corresponding to an input current sensed as a signal is generated, calculate the amount of change of the sensed input current per unit time using the sensed value, and calculate the quality factor by resetting the test frequency according to whether the sign of the change amount has changed or calculating the test resonance frequency and bandwidth based on the stored sensed value. The description of the embodiment above will be given later in detail with reference to FIG. 11.

In another example embodiment, the controller 104 may control the converter circuit 105 to sequentially output a first test signal having a resonance frequency of a pre-designed resonant tank and a second test signal having a pre-designed cut-off frequency before the wireless power transmission device 100 is shipped, and accordingly, store a first sensed value and a second sensed value and detect a foreign object by comparing sizes between the first sensed value and the second sensed value. The description of the example embodiment above will be given later in detail with reference to FIG. 13.

The converter circuit 105 may generate a test signal based on the input current generated by the power supply circuit 101.

The TX resonant tank 106 may transmit a digital ping signal or provide wireless power based on the voltage (or current) generated by the converter circuit 105. The TX resonant tank 106 may transmit wireless power in response to the test signal.

The wireless power reception device 110 may include an RX resonant tank 111, an RX rectifier 112, and an RX load circuit 113.

The RX resonant tank 111 may be magnetically coupled to the TX resonant tank 106 to receive wireless power. The RX resonant tank 111 may output a voltage (and current) based on the received wireless power (e.g., according to the received wireless power, in response to the received wireless power, etc.).

The RX rectifier 112 may rectify the AC voltage (and current) output from the RX resonant tank 111 into a DC voltage to generate a rectified voltage.

The RX load circuit 113 may be a circuit representing a load generated in the wireless power reception device 110.

Figure 2B:
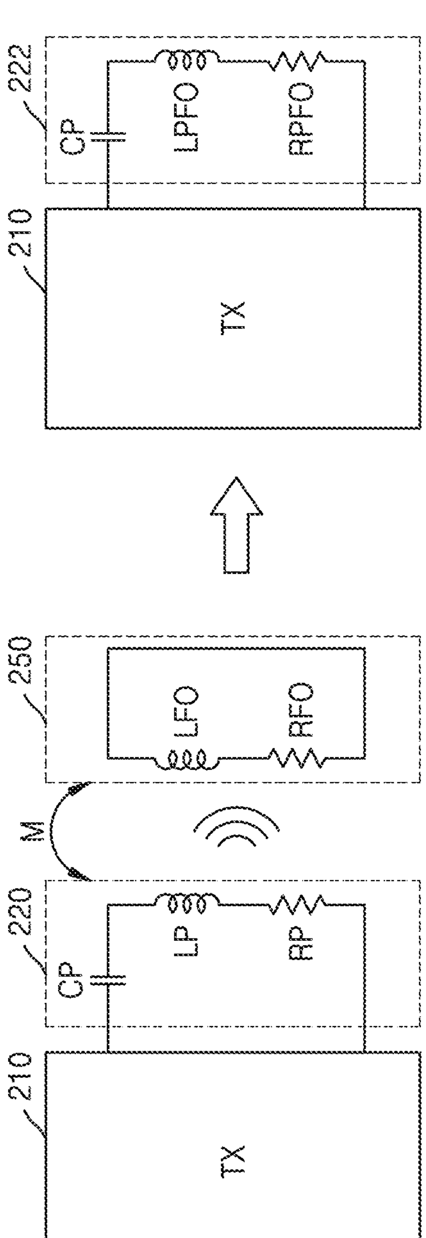

FIGS. 2A and 2B are schematic equivalent circuit diagrams of a resonant tank included in a wireless power transmission device. In particular, FIG. 2A is an equivalent circuit diagram between a wireless power transmission device and a wireless power reception device, and FIG. 2B is an equivalent circuit diagram between a wireless power transmission device and a foreign object.

Referring to FIGS. 1 and 2A, a wireless power transmitter 210 and a TX resonant tank 220 may be included in the wireless power transmission device 100 shown in FIG. 1.

The wireless power transmitter 210 may include the power supply circuit 101, the current sensing circuit 102, the memory 103, the controller 104, and the converter circuit 105 illustrated in FIG. 1.

The TX resonant tank 220 may include a transmission capacitor CP, a transmission inductor LP, and a transmission resistor RP. In an embodiment, the transmit capacitor CP, the transmit inductor LP, and the transmit resistor RP may be connected in series to form a resonant circuit. However, the inventive concepts are not limited thereto, and in another example embodiment, the transmission capacitor CP, the transmission inductor LP, and the transmission resistor RP may be configured as a resonant circuit by a parallel or series-parallel combination.

The resonance frequency Fres of the TX resonant tank 220 may be calculated by substituting the values of the transmission inductor LP and the transmission capacitor CP into [Equation 1] below.

$$F_{res} = \frac{1}{\sqrt{L_P C_P}} \quad \text{[Equation 1]}$$

The quality factor Q of the TX resonant tank 220 may be calculated by substituting the values of the transmission capacitor CP, the transmission inductor LP, and the transmission resistor RP into the following [Equation 2].

$$Q = \frac{1}{R_P}\sqrt{\frac{L_P}{C_P}} \quad \text{[Equation 2]}$$

-continued $$= \frac{F_{res}}{BW}$$

Here, Fres is the resonance frequency and BW is the bandwidth.

The TX resonant tank 220 may be magnetically coupled to the RX resonant tank 230. When the TX resonant tank 220 and the RX resonant tank 230 are magnetically coupled, a mutual inductance M may occur.

Referring to FIGS. 1 and 2A, the RX resonant tank 230, the wireless power receiver 240, and a load resistor RL may be included in the wireless power reception device 110 illustrated in FIG. 1.

The RX resonant tank 230 may include a reception capacitor CS, a reception inductor LS, and a reception resistor RS. In some example embodiments, the reception capacitor CS, the reception inductor LS, and the reception resistor RS may be connected in series to form a resonant circuit. However, the inventive concepts are not limited thereto.

The wireless power receiver 240 may include the RX rectifier 112 illustrated in FIG. 1.

The load resistor RL may correspond to the RX load circuit 113 illustrated in FIG. 1.

The TX resonant tank 220, the RX resonant tank 230, the wireless power receiver 240, and the load resistor RL, for example, may be implemented with an equivalent circuit 221 including an equivalent capacitor CTRX, an equivalent inductor LTRX, and an equivalent resistor RTRX connected in series.

The equivalent inductor LTRX may be expressed as in [Equation 3] below, and the equivalent resistor RTRX may be expressed as [Equation 4] below.

$$L_{TRX} = L_P + \frac{-w^3 C_S M^2 (w^2 C_S L_S - 1)}{(w^2 C_S L_S - 1)^2 + w^2 C_S^2 (R_S + R_L)^2} \cong L_P \quad \text{[Equation 3]}$$

$$R_{TRX} = R_P + \frac{w^4 C_S^2 M^2 (R_S + R_L)}{(w^2 C_S L_S - 1)^2 + w^2 C_S^2 (R_S + R_L)^2} \cong R_P \quad \text{[Equation 4]}$$

Here, w is the angular frequency and M is the mutual inductance. In some example embodiments, when the load resistor RL is sufficiently large, the equivalent inductor LTRX may approximate the transmission inductor LP, and the equivalent resistor RTRX may approximate the transmission resistor RP. Since the equivalent inductor LTRX and the equivalent resistor RTRX approximate the transmission inductor LP and the transmission resistor RP, respectively, the quality factor Q of the equivalent circuit 221 may approximate the quality factor Q of the TX resonant tank 220. In addition, the resonance frequency of the equivalent circuit 221 may be reduced by shielding the wireless power receiver 240.

Referring to FIGS. 1 and 2B, a material of a foreign object may be a metal having conductivity. Since a foreign object, which is a metal, absorbs a magnetic field, the metal foreign object may be implemented as an equivalent circuit 250 including an equivalent inductor LFO and an equivalent resistor RFO, as shown in FIG. 2B. The equivalent inductor LFO and the equivalent resistor RFO may be connected in series, but are not limited thereto.

The equivalent circuit 222 to the TX resonant tank 220 and the equivalent circuit 250 may be implemented with, for example, a transmission capacitor CP, an equivalent inductor LPFO, and an equivalent resistor RPFO connected in series.

The input impedance ZIN for the equivalent circuit 222 may be expressed as in [Equation 5] below.

[Equation 5]

$$ZIN = R_P + jwL_P + \frac{1}{jwC_P} + \frac{(wM)^2}{R_{FO} + jwL_{FO}}$$

$$= \left(R_P + \frac{(wM)^2 R_{FO}}{R_{FO}^2 + (wL_{FO})^2}\right) + jw\left(L_P - \frac{(wM)^2 L_{FO}}{R_{FO}^2 + (wL_{FO})^2}\right) + \frac{1}{jwC_P}$$

Here, w is the angular frequency and M is the mutual inductance. At this time, a value of the equivalent inductor LPFO decreases and a value of the equivalent resistor RPFO increases. Therefore, with respect to the resonance frequency Fres and the quality factor Q of the TX resonant tank 220, the resonance frequency Fres of the equivalent circuit 222 increases, and the quality factor Q of the equivalent circuit 222 decreases.

Figure 3:
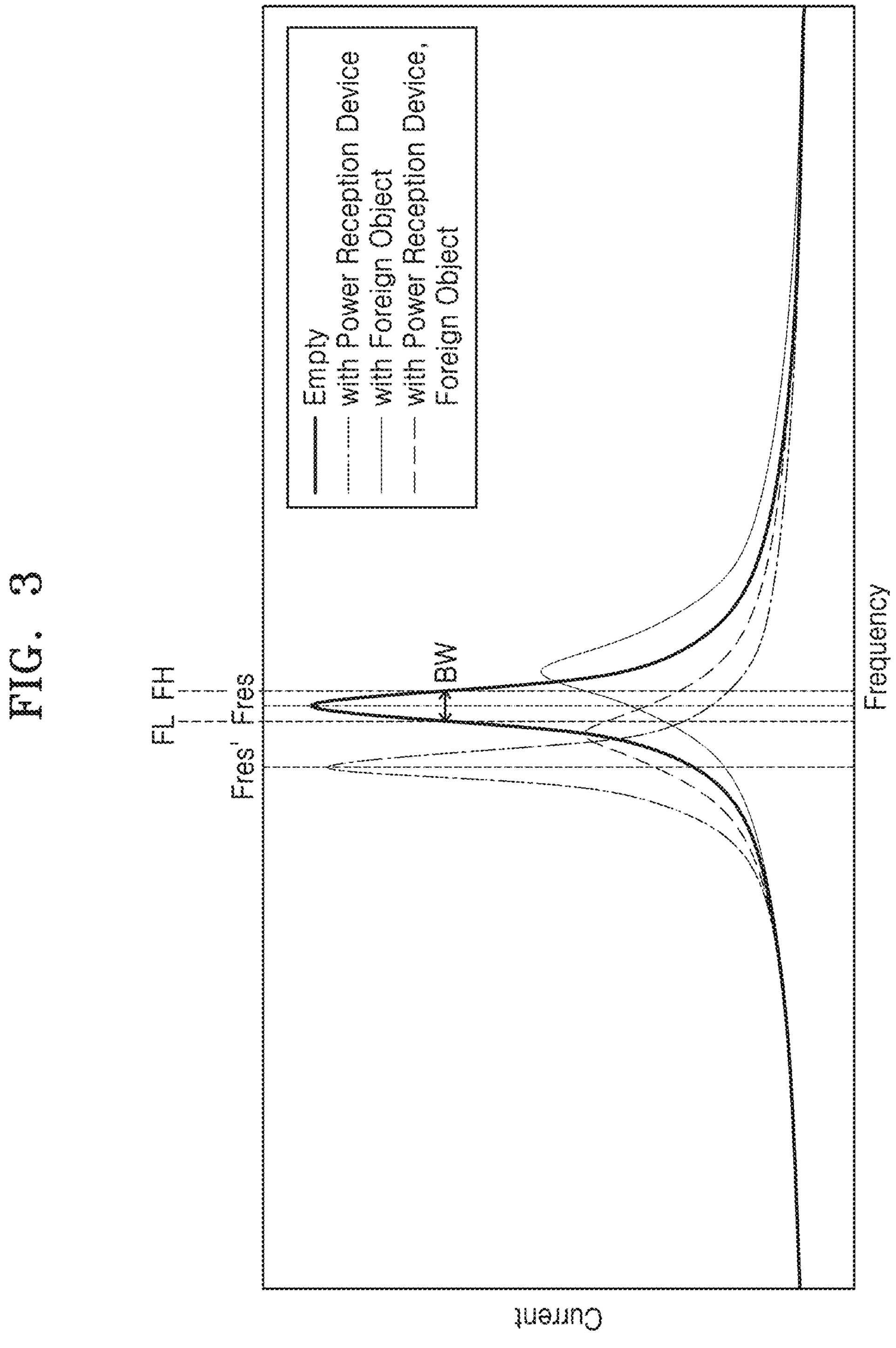
FIG. 3 is a graph schematically showing a coil current input to a resonant tank included in a wireless power transmission device according to an example embodiment of the present inventive concepts according to frequency.

FIG. 3 is a graph schematically showing a coil current input to a resonant tank included in a wireless power transmission device according to an example embodiment of the present inventive concepts according to frequency.

Referring to FIGS. 1, 2A, 2B, and 3, when a foreign object is not around the wireless power transmission device 100, the current according to the frequency may be expressed as a spectrum, as shown in FIG. 3 (Empty). The current may be, for example, a current input to the TX resonant tank 106. A spectrum, such as Empty shown in FIG. 3, may have a resonance frequency Fres, two cut-off frequencies FL and FH, and a bandwidth BW. The current value at the resonance frequency Fres is the greatest value, and the current value at the resonance frequency Fres may be times the current value at the two cut-off frequencies FL and FH. One cut-off frequency FL of the two cut-off frequencies FL and FH is less than the resonance frequency Fres, and the other cut-off frequency FH of the two cut-off frequencies FL and FH is greater than the resonance frequency Fres. The bandwidth BW may be a difference value between the two cut-off frequencies FL and FH. Alternatively, the bandwidth BW may be twice the difference value between any one of the two cut-off frequencies FL and FH and the resonance frequency Fres.

When only the wireless power reception device 110 is present with respect to the wireless power transmission device 100, the current according to the frequency may be expressed as a spectrum, as shown in FIG. 3 (with power reception device). In some example embodiments, since the inductance of the equivalent circuit is increased by shielding of the wireless power reception device 110, the resonance frequency Fres' may be less than the resonance frequency Fres. However, the quality factors may be similar or identical enough to ignore errors.

When only a foreign object is present with respect to the wireless power transmission device 100, the current according to the frequency may be expressed as a spectrum, as shown in FIG. 3 (with foreign object). In some example embodiments, the resonance frequency increases, and the greatest value of the current and the quality factor decrease.

When present together with a foreign object and the wireless power reception device 110 with respect to the wireless power transmission device 100, a current according to a frequency may be expressed as a spectrum, as shown in FIG. 3 (with power reception device and foreign object). In some example embodiments, the resonance frequency, the greatest value of the current, and the quality factor also decrease.

Since the quality factor Q decreases when there is a foreign object, the wireless power transmission device 100 may detect the presence or absence of the foreign object by using the quality factor Q of the TX resonant tank 220.

Figure 4:
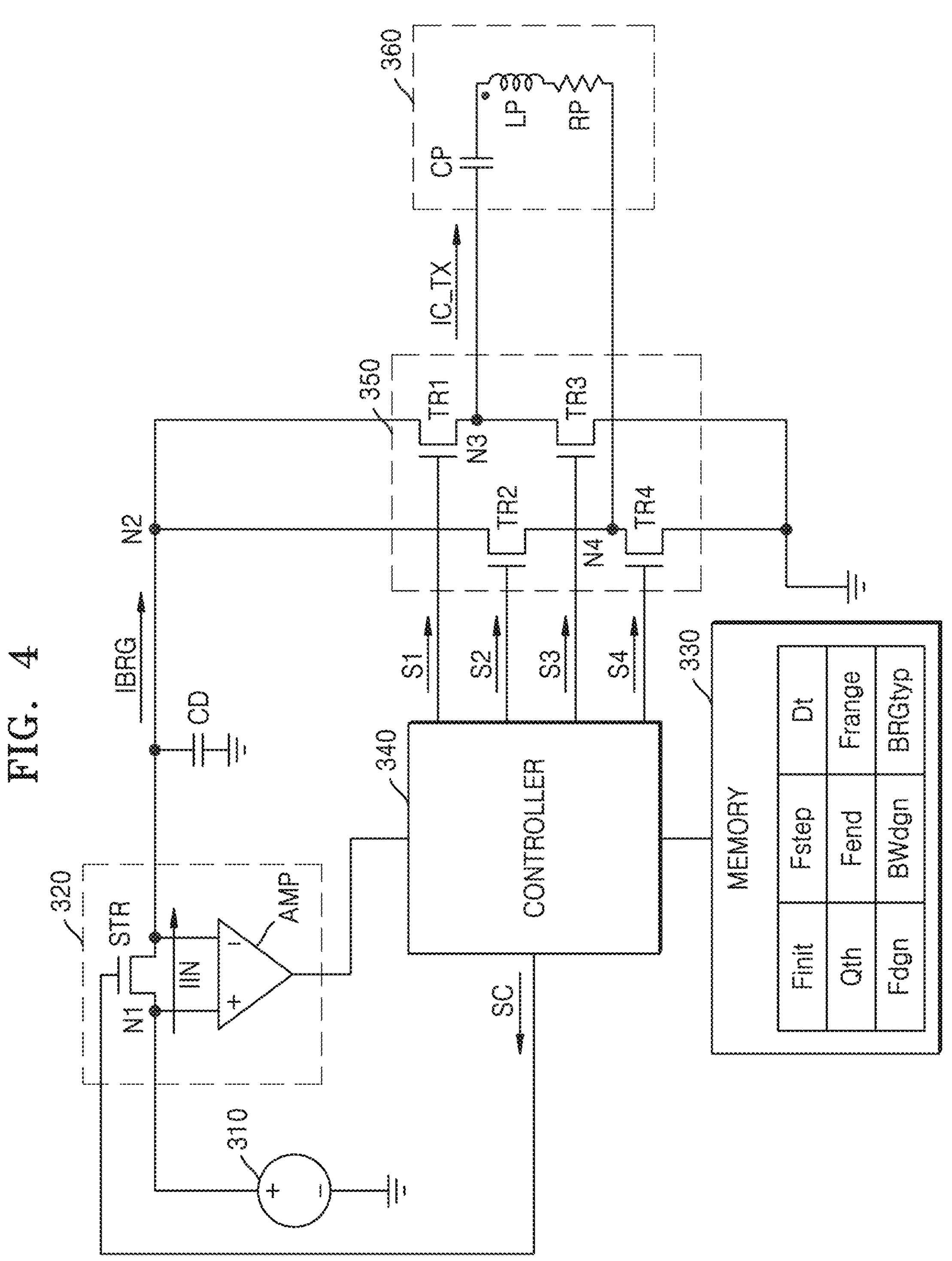
FIG. 4 is a circuit diagram, as an example, for implementing a wireless power transmission device according to an example embodiment of the present inventive concepts.

FIG. 4 is a circuit diagram, as an example, for implementing a wireless power transmission device according to an example embodiment of the present inventive concepts.

Referring to FIGS. 1 and 4, the wireless power transmission device (e.g., the wireless power transmission device 100 shown in FIG. 1) may include a power source 310, a current sensing circuit 320, a memory 330, a controller 340, a converter circuit 350, and a resonant tank 360.

The power source 310 may be connected between the first node N1 and the ground. In particular, for example, one end of the power source 310 may be electrically connected to the first node N1, and the other end of the power source 310 may be electrically connected to the ground. In an example embodiment, the power source 310 may be implemented as a DC voltage source, but is not limited thereto. The power source 310 implemented as a direct voltage source may apply a DC voltage to the first node N1.

The current sensing circuit 320 may be connected between the first node N1 and the second node N2. In an example embodiment, the current sensing circuit 320 may include a sensing transistor STR and an amplifier AMP. However, the inventive concepts are not limited thereto. The sensing transistor STR may be implemented as an N-type Metal Oxide Semiconductor Field Effect Transistor (MOSFET), but is not limited thereto. A first electrode (e.g., a drain electrode) of the sensing transistor STR may be electrically connected to the first node N1, and a second electrode (e.g., a source electrode) of the sensing transistor STR may be electrically connected to the second node N2. The sensing control signal SC may be transmitted to the gate electrode of the sensing transistor STR. The sensing control signal SC may have a turn-on level or a turn-off level. In some example embodiments, when the wireless power transmission device 100 is powered on, the sensing control signal SC has a turn-on level, the sensing transistor STR is turned on, and the input current IIN flows from the first node N1 to the second node N2. The amplifier AMP may amplify a signal corresponding to a difference between the voltage applied to the first node N1 and the voltage applied to the second node N2 and output the amplified signal. The amplified signal may be transmitted to the controller 340. A first input terminal of the amplifier AMP may be electrically connected to the first node N1, and a second input terminal of the amplifier AMP may be electrically connected to the second node N2.

The capacitor CD may be connected between the second node N2 and the ground. In particular, for example, a first terminal of the capacitor CD may be electrically connected to the second node N2, and a second terminal of the capacitor CD may be electrically connected to a ground. The capacitor CD may constantly maintain the voltage generated by the power source 310. Alternatively, the capacitor CD may maintain constant a voltage to be applied to the converter circuit 350 (e.g., a voltage applied to the second node N2).

The bridge current IBRG may be input to the converter circuit 350 through the second node N2.

The memory 330 may store data for detecting a foreign object. For example, the memory 330 may include initial frequency data Finit, frequency step data Fstep, test duty ratio data Dt, reference quality factor data Qth, end frequency data Fend, frequency range data Frange, design resonance frequency data Fdgn, design bandwidth data BWdgn, and bridge circuit operation type data BRGtyp. The initial frequency data Finit is an initial value for initially setting the test frequency of the test signal, that is, data representing the initial frequency. The frequency step data Fstep is data representing a change amount for changing a preset test frequency. The test duty ratio data Dt is data representing a value for setting the duty ratio of the test signal. The reference quality factor data Qth is data representing a value of the reference quality factor. The end frequency data Fend is data representing the last value for finally setting the test frequency of the test signal, that is, the end frequency. For example, when a frequency range is set, the end frequency may be a smallest value or a greatest value of the frequency range. The frequency range data Frange is data representing a range value for setting a test frequency of a test signal. The design resonance frequency data Fdgn is data representing a predesigned (or, alternatively desired, specified, predetermined, etc.) resonance frequency before the wireless power transmission device 100 is shipped. The design bandwidth data BWdgn is data representing a bandwidth designed in advance before the wireless power transmission device 100 is shipped. The bridge circuit operation type data BRGtyp is data representing an operation method of the converter circuit 350. The operation method of the converter circuit 350 may be, for example, a half-bridge circuit operation or a full-bridge circuit operation, but is not limited thereto.

The controller 340 may be connected to an output terminal of the current sensing circuit 320. The controller 340 may be connected to the gate electrode of each of first to fourth transistors TR1, TR2, TR3, and TR4. The controller 340 may transmit the sensing control signal SC to the sensing transistor STR. The controller 340 may output the first to fourth switching signals S1, S2, S3, and S4. For example, the controller 340 may output the first switching signal S1 to the gate electrode of the first transistor TR1, output the second switching signal S2 to the gate electrode of the second transistor TR2, output the third switching signal S3 to the gate electrode of the third transistor TR3, and output the fourth switching signal S4 to the gate electrode of the fourth transistor TR4. The controller 340 may receive a sensed value corresponding to the input current sensed by the current sensing circuit 320. The controller 340 may store the sensed value therein or store the sensed value in the memory 330. The controller 340 may receive data from the memory 330. The controller 340 may include a micro controller unit (MCU) that performs an operation of calculating the quality factor, a logic circuit that outputs the first to fourth switching signals S1, S2, S3, and S4, and various registers.

The converter circuit 350 may be connected between the second node N2 and the ground. In an example embodiment, the converter circuit 350 may include a plurality of switches. For example, the converter circuit 350 may include first to fourth transistors TR1, TR2, TR3, and TR4. The first to fourth transistors TR1, TR2, TR3, and TR4 may be implemented as N-type MOSFETs, but are not limited thereto. The first electrode of the first transistor TR1 may be electrically connected to the second node N2, and the second electrode of the first transistor TR1 may be electrically connected to the third node N3. The first electrode of the second transistor TR2 may be electrically connected to the second node N2, and the second electrode of the second transistor TR2 may be electrically connected to the fourth node N4. The first electrode of the third transistor TR3 may be electrically connected to the third node N3 and the second electrode of the third transistor TR3 may be connected to a ground. The first electrode of the fourth transistor TR4 may be electrically connected to the fourth node N4, and the second electrode of the fourth transistor TR4 may be connected to the ground. The first to fourth switching signals S1, S2, S3, and S4 may be transmitted to the gate electrode of each of the first to fourth transistors TR1, TR2, TR3, and TR4, respectively. Each transistor may be turned on in response to a turn-on level of each switching signal. The converter circuit 350 may operate as a half-bridge circuit or as a full-bridge circuit according to the timing method of the first to fourth switching signals S1, S2, S3, and S4. The converter circuit 350 may provide the transmission coil current IC_TX to the TX resonant tank 360, in response to the first to fourth switching signals S1, S2, S3, and S4. The converter circuit 350 herein may be referred to as a bridge circuit.

The TX resonant tank 360 may be connected between the third node N3 and the fourth node N4. In particular, for example, the TX resonant tank 360 includes a transmission capacitor CP, a transmission inductor LP, and a transmission resistor RP connected in series, and one end of the transmission capacitor CP may be electrically connected to the third node N3, and one end of the transmission resistor RP may be electrically connected to the fourth node N4.

Figure 5:
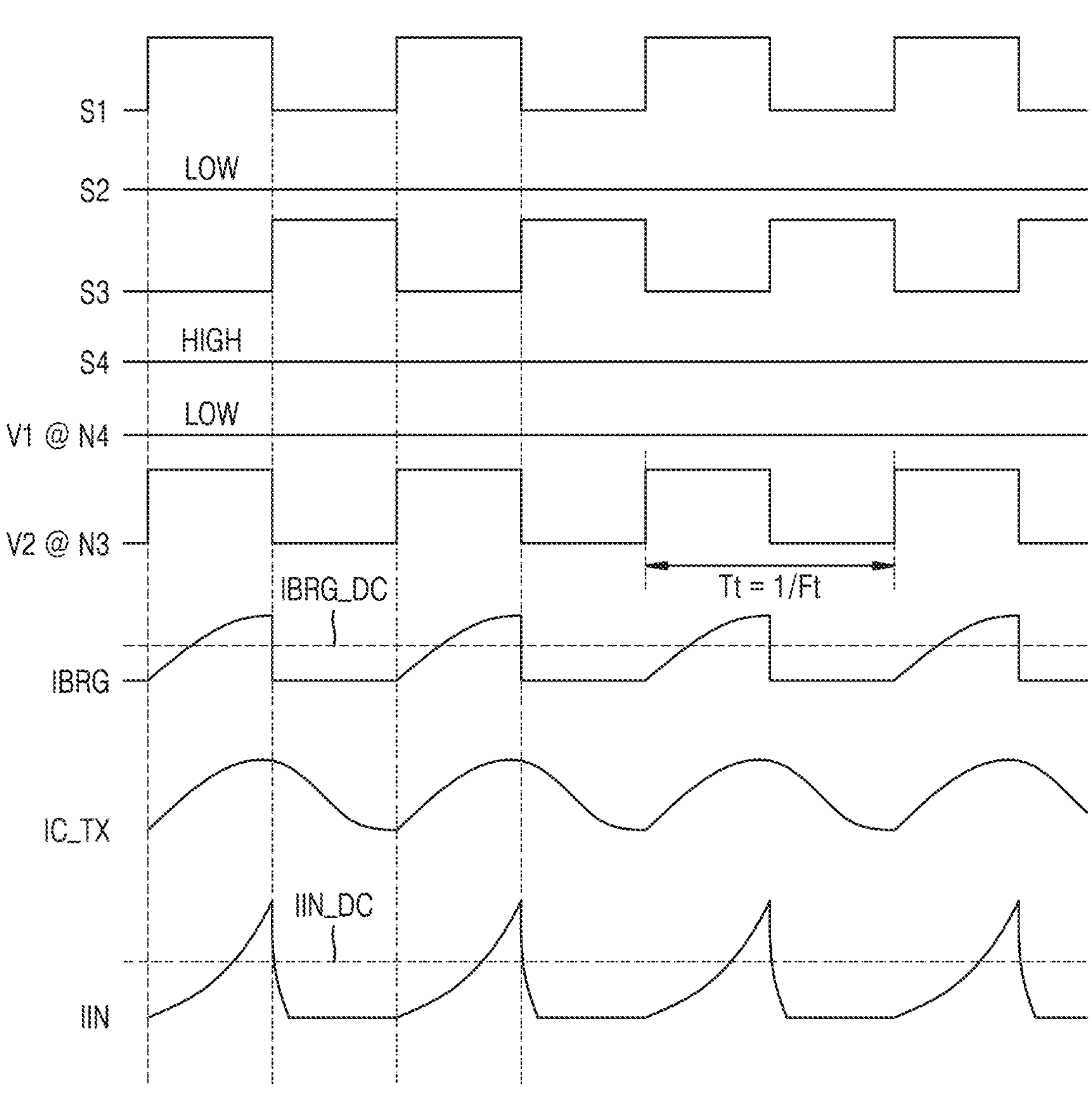
FIG. 5 is a diagram for explaining an example embodiment of an operation timing between switching signals, a voltage and a current applied to a resonant tank, and an input current.

FIG. 5 is a diagram for explaining an example embodiment of an operation timing between switching signals, a voltage and a current applied to a resonant tank, and an input current. In particular, FIG. 5 is a timing diagram of signals for the converter circuit 350 to operate as a half bridge.

Referring to FIGS. 4 and 5, the first signal group may be referred to as a group including first and third switching signals S1 and S3. The second signal group may be referred to as a group including the second and fourth switching signals S2 and S4. In some example embodiments, one signal group of the first signal group and the second signal group may be a square wave having a test frequency Ft and a test duty ratio. Referring to FIG. 5, for example, the first and third switching signals S1 and S3 may be square waves, and the second and fourth switching signals S2 and S4 may have a constant level. However, the inventive concepts are not limited thereto, and the first and third switching signals S1 and S3 may have a constant or substantially constant level, and the second and fourth switching signals S2 and S4 may be square waves. The square wave may be a waveform having one level (e.g., turn-on level, logic high level HIGH, etc.) and another level (e.g., turn-off level, logic low level LOW, etc.) during one period. The duty ratio of the square wave may be determined according to the previously stored test duty ratio data Dt. The period Tt of the square wave may be the reciprocal of the test frequency Ft. When the first and third switching signals S1 and S3 are square waves, a phase difference between the first and third switching signals S1 and S3 may be 180 degrees. For example, the first switching signal S1 may have a logic high level HIGH (or turn-on level) and the third switching signal S3 may have a logic low level LOW (or turn-off level). In some example embodiments, when the first signal group is a square wave, any one of the second and fourth switching signals S2 and S4 has a turn-on level that turns on the transistor, and another one of the second and fourth switching signals S2 and S4 may have a turn-off level. For example, the second switching signal S2 may have a logic low level LOW (or turn-off level) and the fourth switching signal S4 may have a logic high level HIGH (or turn-on level). However, the inventive concepts are not limited thereto, and when the first and third switching signals S1 and S3 are square waves, the second switching signal S2 may have a logic high level HIGH and the fourth switching signal S4 may have a logic low level LOW.

The first voltage V1 @ N4 applied to the fourth node N4 may have a logic low level LOW. Since the third switching signal S3 is at a turn-on level, the voltage level applied to the third node N3 by turning on the third transistor TR3 is the ground level. Accordingly, the voltage level of the first voltage V1 @ N4 applied to the fourth node N4 may be the ground level. The second voltage V2 @ N3 applied to the third node N3 may be a square wave having a test frequency Ft. A potential difference between the first voltage V1 @ N4 and the second voltage V2 @ N3 may be a test signal.

When the voltage level of the first switching signal S1 is the turn-on level, the voltage level of the second switching signal S2 is the turn-off level, the voltage level of the third switching signal S3 is the turn-off level, and the voltage level of the fourth switching signal S4 is the turn-on level, a voltage level of the first voltage V1 @ N4 may be lower than a voltage level of the second voltage V2 @ N3.

When the voltage level of the first switching signal S1 is the turn-off level, the voltage level of the second switching signal S2 is the turn-off level, the voltage level of the third switching signal S3 is the turn-on level, and the voltage level of the fourth switching signal S4 is the turn-on level, a voltage level of the first voltage V1 @ N4 may be the same as the voltage level of the second voltage V2 @ N3.

The transmission coil current IC_TX may be an alternating current, as shown in FIG. 5. The magnitude of the transmission coil current IC_TX may be expressed as the magnitude of the potential difference between the first voltage V1 @ N4 and the second voltage V2 @ N3 with respect to the magnitude of the input impedance (e.g., ZIN). The frequency when the magnitude of the input impedance is the smallest or the transmission coil current IC_TX is the greatest may be a resonance frequency. Since the resonance frequency is required to calculate the quality factor Q, it is desirable or necessary to obtain information on the magnitude of the input impedance ZIN.

In addition, the bridge current IBRG and the input current IIN may have waveforms as shown in FIG. 5. The DC component IBRG_DC of the bridge current IBRG may be expressed as in [Equation 6] below.

$$\begin{aligned} \text{IBRG\_DC} &= f_t * |\text{IC\_TX}| \int_0^{D/f_t} \cos(2\pi f_t t)dt \\ &= \frac{1}{2\pi} * |\text{IC\_TX}| \sin(2\pi D) = \frac{A(D)}{|Z(f_t)|} \end{aligned} \qquad \text{[Equation 6]}$$

Here, ft may be the test frequency, D may be a duty ratio of the test signal, Z(ft) may be an impedance (or input impedance) at the test frequency, and A(D) may be a coefficient (constant) for the duty ratio. That is, the DC component IBRG_DC of the bridge current IBRG may include information on the magnitude of the input impedance.

The magnitude of the DC component IBRG_DC of the bridge current IBRG may be the same or substantially the same as the magnitude of the DC component IIN_DC of the input current IIN. Accordingly, information on the input impedance is obtained by sensing the DC component IIN_DC of the input current IIN. When the magnitude of the input impedance is the smallest, the DC component IIN_DC of the input current IIN may be the largest.

As described above, by implementing the test signal shown in FIG. 5 only with the converter circuit 350 without separate hardware, there is an effect of reducing the manufacturing cost and promoting integration.

The test signal may be weak enough that the wireless power reception device 110 does not wake up. When the wireless power reception device 110 wakes up by a test signal, a foreign object may be incorrectly determined because the quality factor is reduced by the load resistor RL.

As described above, when the test signal is weakly generated, the quality factor Q is more accurately calculated, and there is an effect of more accurately detecting a foreign object.

Figure 6:
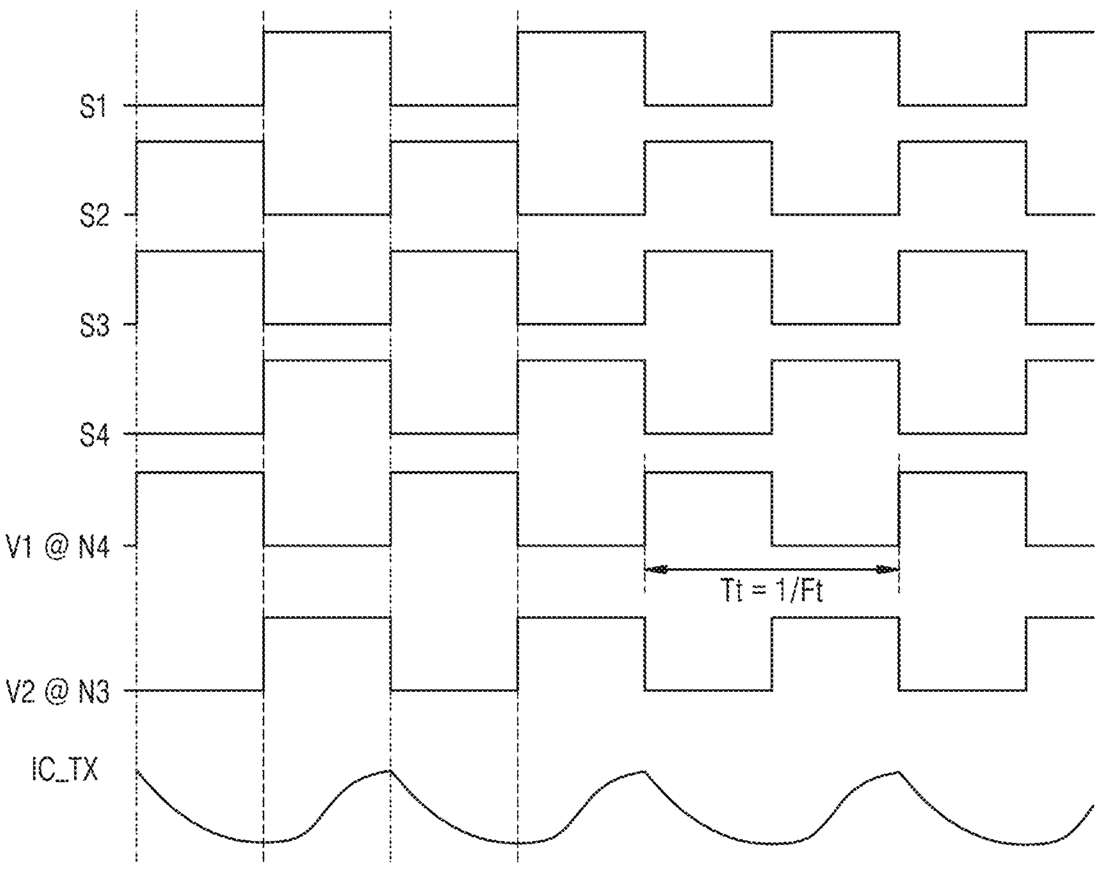
FIG. 6 is a view for explaining another example embodiment of an operation timing between switching signals, a voltage and a current applied to the resonant tank, and an input current.

FIG. 6 is a diagram for explaining another example embodiment of an operation timing between switching signals, a voltage and a current applied to a resonant tank, and an input current. In particular, FIG. 6 is a timing diagram of signals for the converter circuit 350 to operate as a full bridge.

Referring to FIGS. 4 and 6, the first signal group and the second signal group may be square waves having a test frequency and a test duty ratio. In some example embodiments, the phase difference of the first signal group may be 180 degrees, and the phase difference of the second signal group may also be 180 degrees. Moreover, the phase difference between the first switching signal S1 and the fourth switching signal S4 is 0 degrees (or 360 degrees), and the phase difference between the second switching signal S2 and the third switching signal S3 is also 0 degrees (or 360 degrees). For example, when the first switching signal S1 and the fourth switching signal S4 may have a turn-off level, the second switching signal S2 and the third switching signal S3 may have a turn-on level.

The first voltage V1 @ N4 applied to the fourth node N4 and the second voltage V2 @ N3 applied to the third node N3 may be a square wave having a test frequency Ft. In addition, a phase difference between the first voltage V1 @ N4 and the second voltage V2 @ N3 may be 180 degrees. A potential difference between the first voltage V1 @ N4 and the second voltage V2 @ N3 may be a test signal. As the first voltage V1 @ N4 and the second voltage V2 @ N3 are generated, the transmission coil current IC_TX is as shown in FIG. 6.

When the voltage levels of the first switching signal S1 and the fourth switching signal S4 are turn-off levels and the voltage levels of the second switching signal S2 and the third switching signal S3 are turn-on levels, a voltage level of the first voltage V1 @ N4 may be higher than a voltage level of the second voltage V2 @ N3.

When the voltage levels of the first switching signal S1 and the fourth switching signal S4 are turn-on levels and the voltage levels of the second switching signal S2 and the third switching signal S3 are turn-off levels, a voltage level of the first voltage V1 @ N4 may be lower than a voltage level of the second voltage V2 @ N3.

The test signals shown in FIGS. 5 and 6 may have a test duty ratio, and the test duty ratio may be included in a preset (or alternatively, desired, specified, predetermined, etc.) duty ratio range. As the value of the test duty ratio is closer to the smallest value of the duty ratio range, the test signal is weak enough that the wireless power reception device 110 does not wake up, and since the quality factor Q is calculated more accurately, there is an effect of more accurately detecting a foreign object. On the other hand, as the value of the test duty ratio is closer to the greatest value of the duty ratio range, it is possible to accurately sense the input current IIN, and since the quality factor Q is calculated more accurately, there is an effect of more accurately detecting a foreign object.

As described above, by implementing the test signal shown in FIG. 6 only with the converter circuit 350 without separate hardware, there is an effect of reducing the manufacturing cost and promoting integration.

Figure 7:
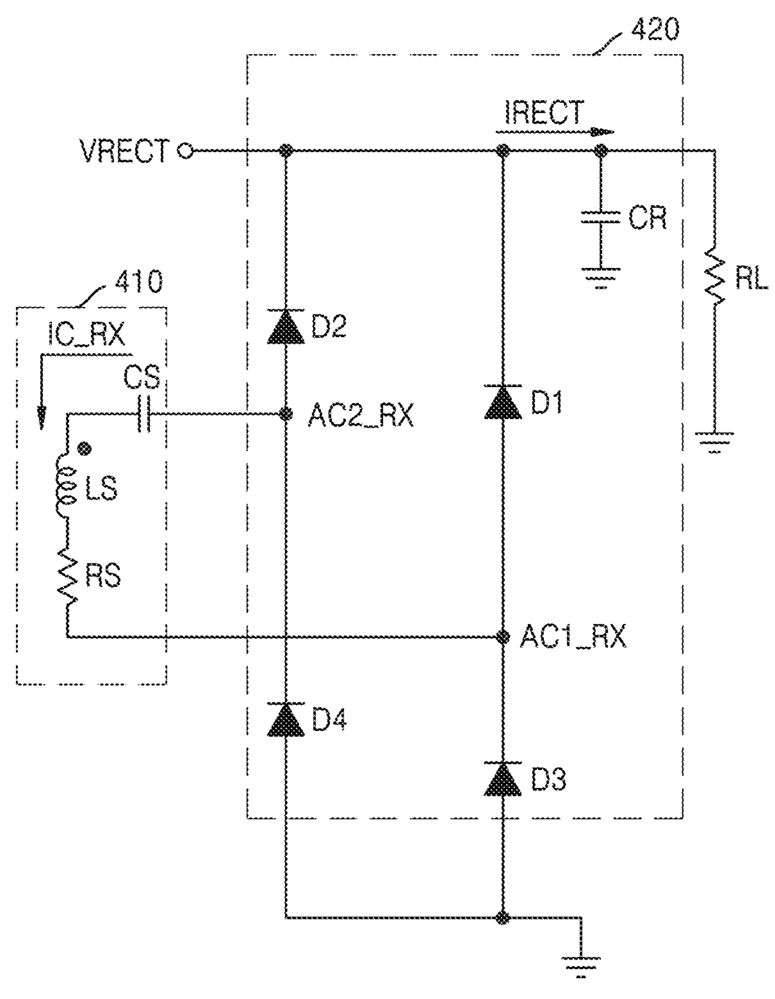
FIG. 7 is a circuit diagram, as an example, for implementing a wireless power reception device according to an example embodiment of the present inventive concepts.

FIG. 7 is a circuit diagram, as an example, for implementing a wireless power reception device according to an example embodiment of the present inventive concepts.

Referring to FIGS. 1, 4 and 7, the wireless power reception device 110 may include an RX resonant tank 410, a reception rectification circuit 420, and a load resistor RL.

The RX resonant tank 410 may include a reception capacitor CS, a reception inductor LS, and a reception resistor RS connected in series, as shown in FIG. 2A. As the RX resonant tank 410 and the TX resonant tank 360 shown in FIG. 4 are magnetically coupled, a reception coil current IC_RX may flow in the RX resonant tank 410.

The reception rectification circuit 420 may be an example of the reception rectification circuit 112 shown in FIG. 1. The reception rectification circuit 420 may include first to fourth diodes D1, D2, D3, and D4 and a rectification capacitor CR. In another embodiment, the reception rectification circuit 420 may include transistors instead of the first to fourth diodes D1, D2, D3, and D4. The first diode D1 may be connected between the rectification capacitor CR and the first receiving node AC1_RX. The second diode D2 may be connected between the rectification capacitor CR and the second reception node AC2_RX. The third diode D3 may be connected between the first reception node AC1_RX and the ground. The fourth diode D4 may be connected between the second reception node AC2_RX and the ground. The rectification capacitor CR may be connected between a node to which the first diode D1 and the second diode D2 are connected and a ground. When the reception coil current IC_RX is generated, the reception rectification circuit 420 may generate a rectified voltage VRECT and a rectified current IRECT.

The load resistor RL may be connected between the rectification capacitor CR and the ground.

Figure 8:
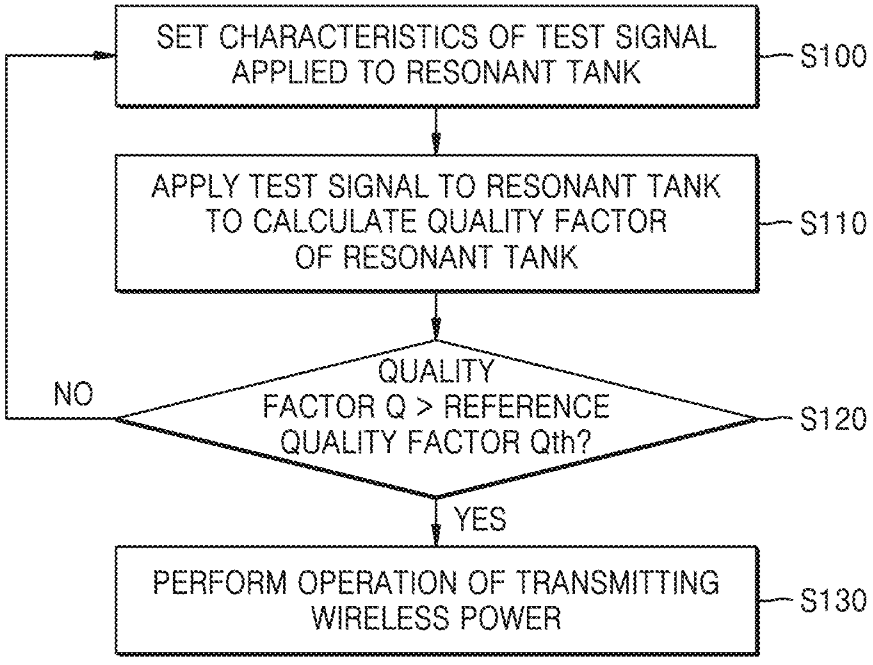
FIG. 8 is a flowchart for explaining a method of operating a wireless power transmitter, according to an example embodiment of the present inventive concepts.

FIG. 8 is a flowchart for explaining a method of operating a wireless power transmitter, according to an example embodiment of the present inventive concepts.

Referring to FIGS. 2A, 2B, 4 and 8, an operating method of a wireless power transmitter includes setting the characteristics of the test signal applied to the resonant tank S100, applying a test signal to the resonant tank to calculate the quality factor of the resonant tank S110, comparing the quality factor to the pre-stored reference quality factor S120, and resetting the test frequency according to the comparison result (S120, NO, and S100) or performing an operation of transmitting wireless power S130.

In operation S100, the wireless power transmitter 210 sets the characteristics of the test signal input to the resonant tank (e.g., the TX resonant tank 220). Here, the characteristic of the test signal may be a test frequency Ft of the test signal. In addition, the characteristic of the test signal may further include a test duty ratio of the test signal.

In operation S110, the wireless power transmitter 210 applies a test signal to the resonant tank to calculate a quality factor of the resonant tank. A method of calculating the quality factor will be described later with reference to FIGS. 9, 11, and 13.

In operation S120, the wireless power transmitter 210 compares the quality factor with a pre-stored (or alternatively, desired, specified, etc.) reference quality factor. In particular, for example, the wireless power transmitter 210 determines whether the quality factor is greater than the reference quality factor. The reference quality factor data Qth may be stored, for example, in the memory 330 illustrated in FIG. 4.

If the quality factor is greater than the reference quality factor (S120, YES), in operation S130, the wireless power transmitter 210 performs an operation of transmitting wireless power.

If the quality factor is less than or equal to the reference quality factor (S120, NO), operation S100 is performed. Resetting the test frequency may mean changing the test frequency or setting the test frequency to an initial value.

Figure 9:
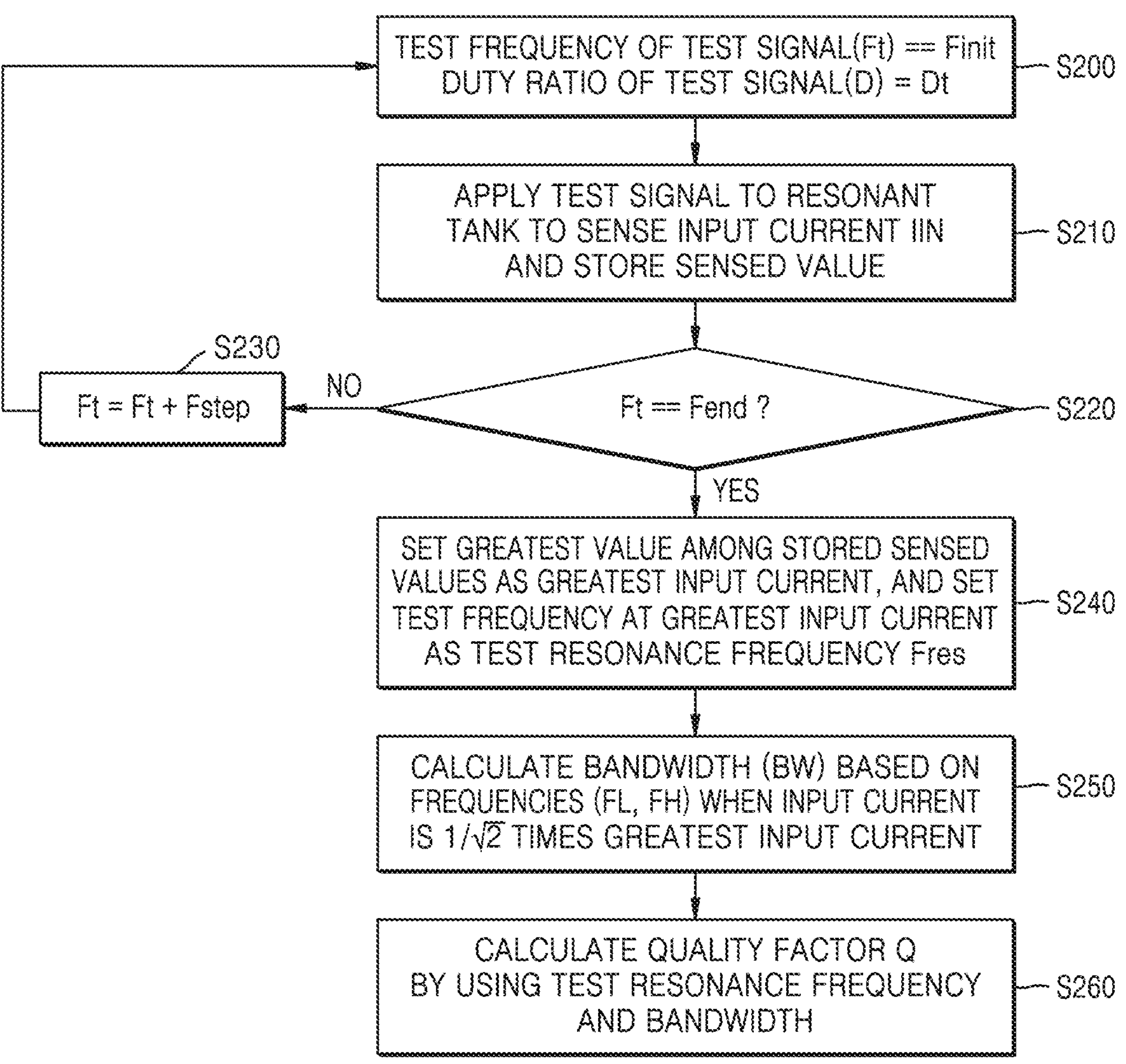
FIG. 9 is a flowchart illustrating an example embodiment of calculating a quality factor.

FIG. 9 is a flowchart illustrating an example embodiment of calculating a quality factor.

Referring to FIGS. 4 and 9, in operation S200, the controller 340 sets the test frequency Ft of the test signal to the initial test frequency Finit, and sets the test duty ratio D of the test signal to the test duty ratio Dt. The initial test frequency Finit is included in a pre-stored frequency range, and may be, for example, a smallest value or a greatest value of the frequency range. The test signal is a square wave having a test duty ratio in a preset (or alternatively, desired, specified, etc.) duty ratio range.

In operation S210, the converter circuit 350 applies a test signal to the TX resonant tank 360, the current sensing circuit 320 senses the input current IIN, and the controller 340 stores a sensed value corresponding to the sensed input current. In particular, the controller 340 controls the converter circuit 350 to generate a test signal, and stores the sensed value corresponding to the input current IIN sensed by the current sensing circuit 320 internally or in the memory 330.

In operation S220, the controller 340 checks whether the set test frequency Ft is an end frequency Fend. If the test frequency Ft is not the end frequency Fend (S220, NO), in operation S230, the controller 340 sets a new test frequency by adding a frequency step Fstep to the set test frequency Ft. In another example embodiment, the controller 340 sets a new test frequency by subtracting a frequency step Fstep from the set test frequency Ft. Operations S210, S220, and S230 are repeatedly performed until the test frequency Ft reaches the end frequency Fend. That is, the controller 340 controls the converter circuit 350 to sequentially generate a signal having a frequency in a pre-stored frequency range as a test signal, the converter circuit 350 applies the test signal to the resonant tank 360, the current sensing circuit 320 sequentially senses the input current sensed as the test signal is sequentially generated, and the controller 340 sequentially stores sensed values corresponding to the sensed input current.

If the test frequency Ft is the end frequency Fend (S220, YES), in operation S240, the controller 340 sets a greatest value among the stored sensed values as a greatest input current, and sets a test frequency at the greatest input current as a test resonance frequency Fres. In particular, the controller 340 sets the input current corresponding to the greatest value among the stored sensed values as the greatest input current, and sets the frequency as the test resonance frequency when the greatest input current is sensed.

In operation S250, the controller 340 calculates the bandwidth BW based on the frequencies FL and FH when the input current is $1/\sqrt{2}$ times (or 0.707 times) the greatest input current. In particular, for example, the controller 340 obtains at least one sensed value smaller by 3 dB (or more or less dB) than the greatest value (or greatest input current) among the stored sensed values, and sets a frequency when an input current corresponding to the at least one sensed value is sensed as the at least one cut-off frequency. In addition, when the number of cut-off frequencies is two, the controller 340 calculates a difference between the cut-off frequencies as a bandwidth. Alternatively, when the number of cut-off frequencies is one, the controller 340 calculates twice the difference between the cut-off frequency and the test resonance frequency as a bandwidth.

In operation S260, the controller 340 calculates the quality factor Q using the test resonance frequency and bandwidth. A method of calculating the quality factor Q is the same as described above with reference to [Equation 2].

Figure 10A:
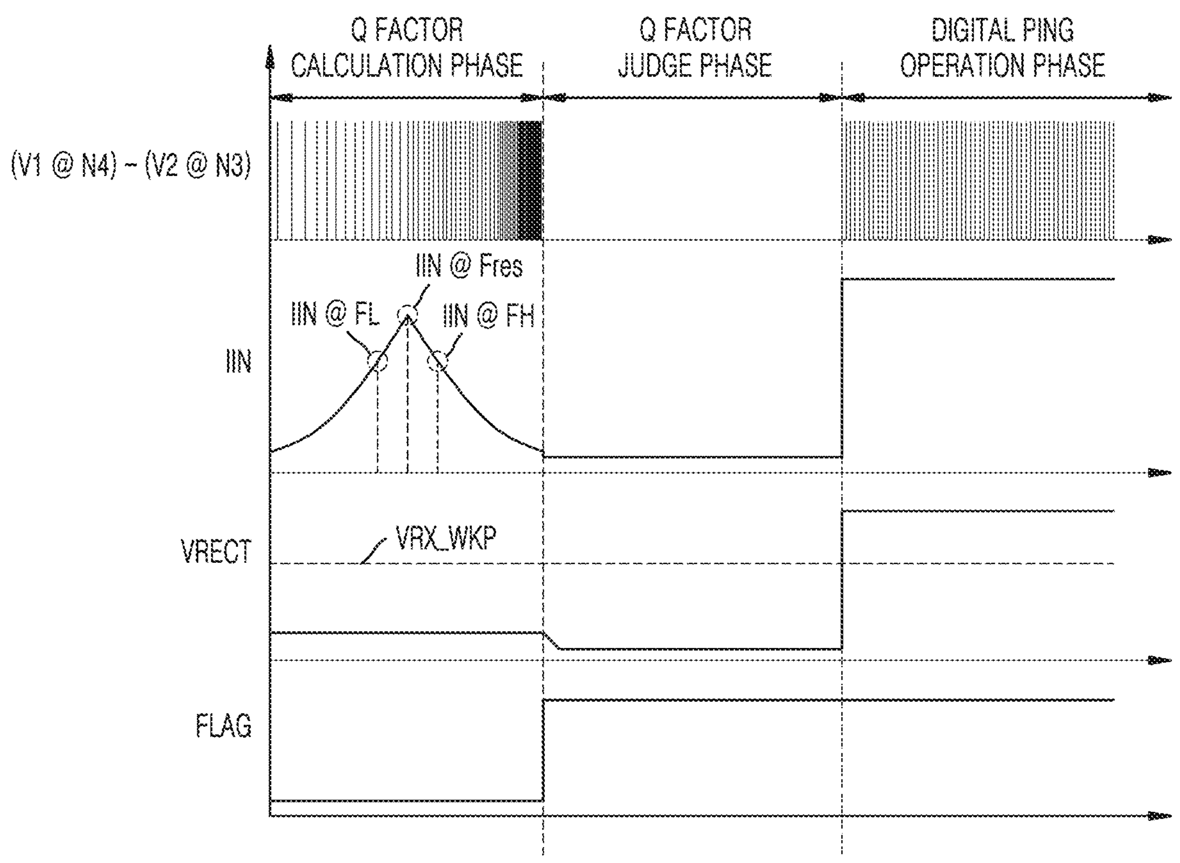
FIGS. 10A and 10B are graphs schematically illustrating a potential difference, an input current, a flag signal, and a rectified voltage applied to a resonant tank according to the example embodiment shown in FIG. 9.
Figure 10B:
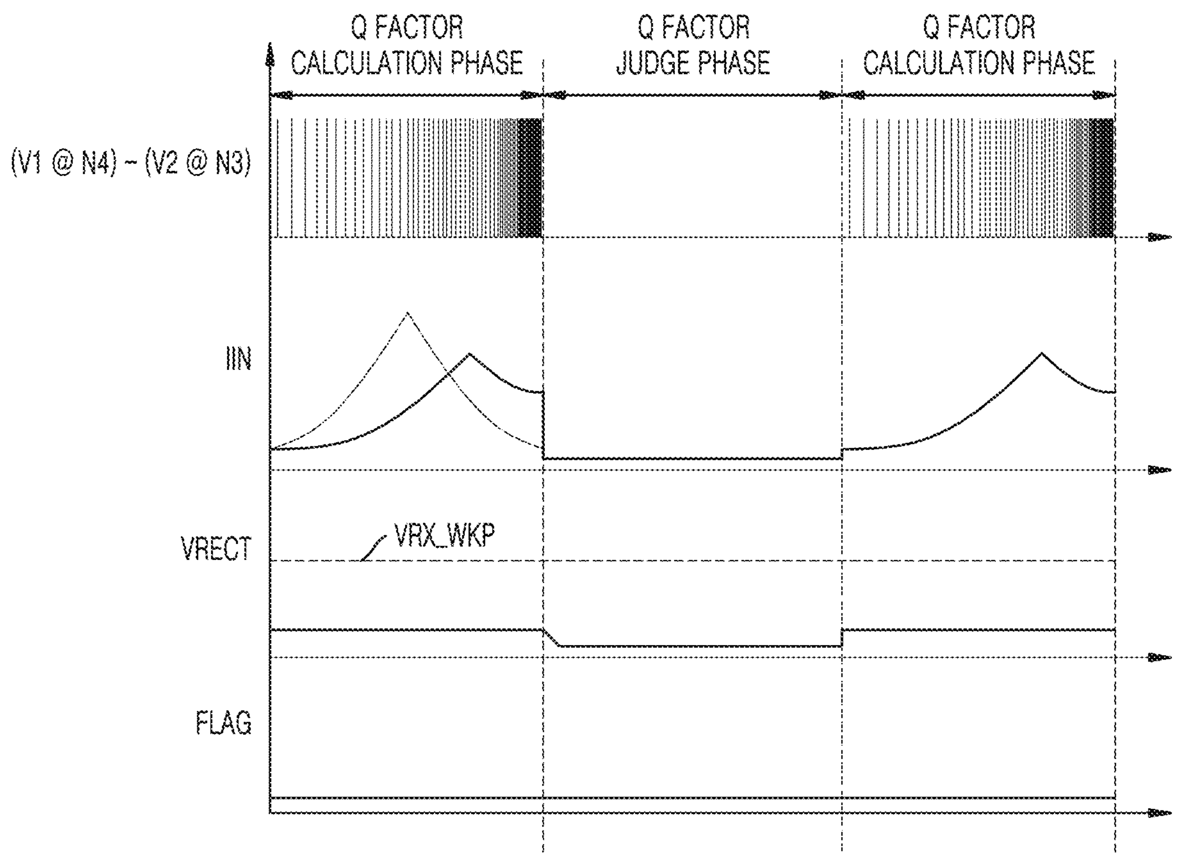

FIGS. 10A and 10B are graphs schematically illustrating a potential difference, an input current, a flag signal, and a rectified voltage applied to a resonant tank according to the embodiment shown in FIG. 9. In particular, FIG. 10A is a graph showing signals that may occur when there is no foreign object, and FIG. 10B is a graph showing signals that may occur when a foreign object is detected.

Referring to FIGS. 2A, 4 to 6 and 10A, in an example embodiment, the operation of the wireless power transmitter 210 may include a first phase (Q FACTOR CALCULATION PHASE), a second phase (Q FACTOR JUDGE PHASE), and a third phase (DIGITAL PING OPERATION PHASE).

The first phase (Q FACTOR CALCULATION PHASE) may be a period during which an operation for calculating the quality factor Q is performed. In particular, in the first phase (Q FACTOR CALCULATION PHASE), a potential difference between the first voltage V1 @ N4 and the second voltage V2 @ N3 is provided to the TX resonant tank 220 as a test signal, and accordingly, the input current IIN may be sensed. The input current IIN @ Fres at the test resonance frequency is the largest, and the input current at the test resonance frequency IIN @ Fres is 3 dB greater than the input current at the cut-off frequencies IIN @ FL and IIN @ FH. The voltage level of the rectified voltage VRECT generated by the reception rectification circuit 420 is lower than the voltage level of the preset (or alternatively, desired, specified, etc.) wake-up voltage VRX_WKP. The preset wake-up voltage VRX_WKP may be a voltage required for the wireless power receiver 240 to wake up. The flag signal FLAG may be a signal generated by the controller 340. In particular, when the controller 340 includes an MCU and a logic circuit, the MCU transmits a flag signal FLAG having a turn-on level (or logic high level) to the logic circuit, and the logic circuit may output the first to fourth switching signals S1, S2, S3, and S4 to transmit a digital ping signal.

The second phase (Q FACTOR JUDGE PHASE) may be a period during which an operation of comparing the calculated quality factor with a preset reference quality factor is performed. In particular, in the second phase (Q FACTOR JUDGE PHASE), the generation of the test signal is stopped. Accordingly, the input current IIN may or may not have a very small value, and the rectified voltage VRECT may or may not have a very small voltage level. If the quality factor is greater than the reference quality factor, the voltage level of the flag signal FLAG is changed from a logic low level to a logic high level.

The third phase (DIGITAL PING OPERATION PHASE) may be a period during which an operation for transmitting a digital ping signal is performed. In particular, in the third phase (DIGITAL PING OPERATION PHASE), the first voltage V1 @ N4 and the second voltage V2 @ N3 may have the same or substantially the same shape as the waveform shown in FIG. 6. However, the potential difference between the first voltage V1 @ N4 and the second voltage V2 @ N3 is greater than the magnitude of the test signal. The input current IIN flows while maintaining a constant or substantially constant level. The voltage level of the rectified voltage VRECT is higher than the voltage level of the preset wake-up voltage VRX_WKP. The wireless power receiver 240 wakes up.

On the other hand, referring to FIGS. 2A, 4 to 6 and 10B, if there is a foreign object, the operation of the wireless power transmitter 210 may include a first phase (Q FACTOR CALCULATION PHASE) and a second phase (Q FACTOR JUDGE PHASE).

In the first phase Q FACTOR CALCULATION PHASE, the greatest value of the input current IIN is smaller than the greatest value of the input current IIN shown in FIG. 10A. In the second phase (Q FACTOR JUDGE PHASE), when it is determined that the quality factor is smaller than the reference quality factor, the voltage level of the flag signal FLAG maintains a logic low level. After the second phase (Q FACTOR JUDGE PHASE), when the first phase (Q FACTOR CALCULATION PHASE) arrives, and until the foreign object is removed, the first phase (Q FACTOR CALCULATION PHASE) and the second phase (Q FACTOR JUDGE PHASE) are repeated.

Figure 11:
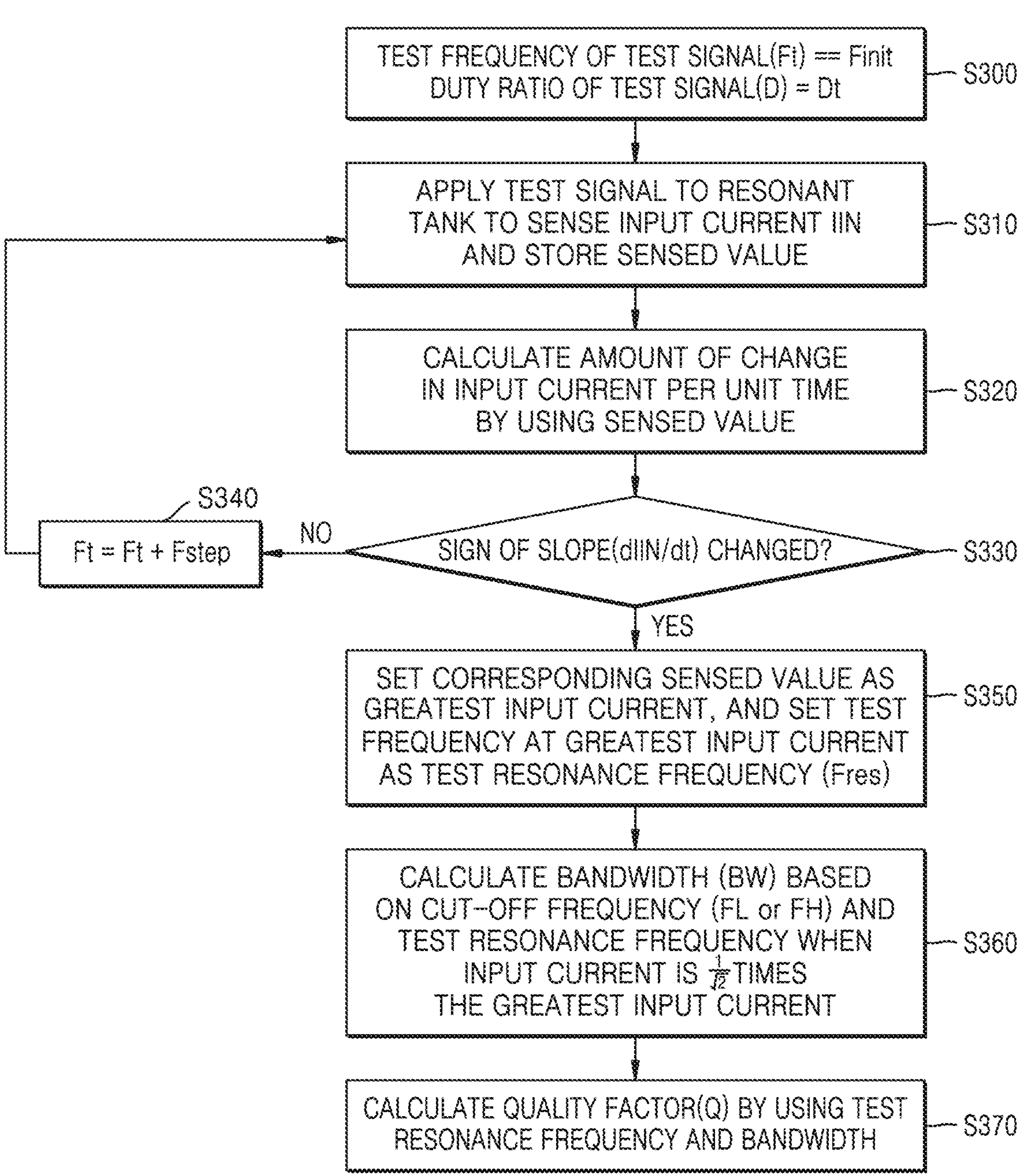
FIG. 11 is a flowchart for explaining another example embodiment of calculating a quality factor.

FIG. 11 is a flowchart for explaining another example embodiment of calculating a quality factor.

Referring to FIGS. 4 and 11, operations S300 and S310 are the same as operations S200 and S210 described above with reference to FIG. 9.

In operation S320, the controller 340 calculates the amount of change in the input current per unit time using the sensed value. The amount of change of the input current per unit time may be referred to as a slope (dIIN/dt).

In operation S330, the controller 340 determines whether the sign of the slope is changed. The change in the sign of the slope may mean that the sign of the slope is changed from positive to negative or changed from negative to positive. By determining whether the sign of the slope is changed, the greatest input current, test resonance frequency, quality factor, etc. may be calculated more quickly, and as a result, it is effective to quickly check whether a foreign object is detected. On the other hand, if it is checked whether the sign of the slope is changed, the sensed input current tends to continue to increase or decrease.

If the sign of the slope does not change, that is, if the sign of the slope is constant (S330, NO), in operation S340, the controller 340 calculates a frequency step Fstep stored in advance at the initial frequency, and resets the calculated frequency to the test frequency. Operation S340 may be the same as operation S230 described above with reference to FIG. 9. Until the sign is changed, changing the frequency (e.g., operation S340), storing the sensed value (e.g., operation S310), and calculating the amount of change per unit time (e.g., operation S320) are repeated.

When the sign is changed (S330, YES), in operation S350, the controller 340 sets the corresponding sensed value as the greatest input current, and sets the test frequency at the greatest input current as the test resonance frequency Fres. In particular, when the sign is changed, the controller 340 sets the input current corresponding to the stored sensed value as the greatest input current, and sets the frequency as the test resonance frequency when the greatest input current is sensed.

In operation S360, the controller 340 calculates the bandwidth BW based on the frequencies FL and FH when the input current is $$\frac{1}{\sqrt{2}}$$

times (or 0.707 times) the greater input current. The controller 340 searches for a sensed value smaller than the stored sensed value by 3 dB when a sign is changed from among the stored sensed values. Then, the controller 340 performs a cut-off frequency when an input current corresponding to the sensed value is sensed. Then, the controller 340 calculates twice the difference between the cut-off frequency FL or FH and the test resonance frequency Fres as the bandwidth. On the other hand, since the sensed input current continues to increase or decrease, one cut-off frequency FL or FH is calculated.

Operation S370 is the same or substantially the same as operation S260 described above with reference to FIG. 9.

As described above, there is a benefit in that the time for calculating the quality factor may be reduced.

Figure 12A:
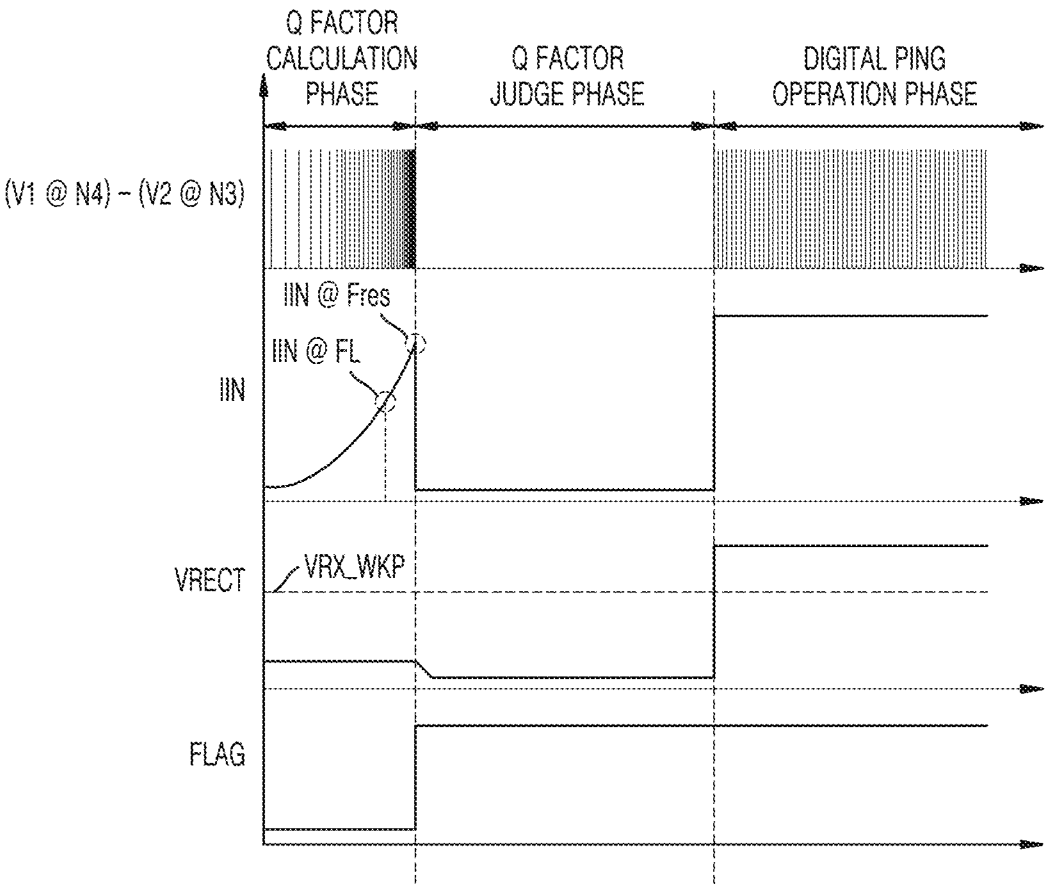
FIGS. 12A and 12B are graphs schematically illustrating a potential difference, an input current, a flag signal, and a rectified voltage applied to a resonant tank according to the example embodiment shown in FIG. 11.
Figure 12B:
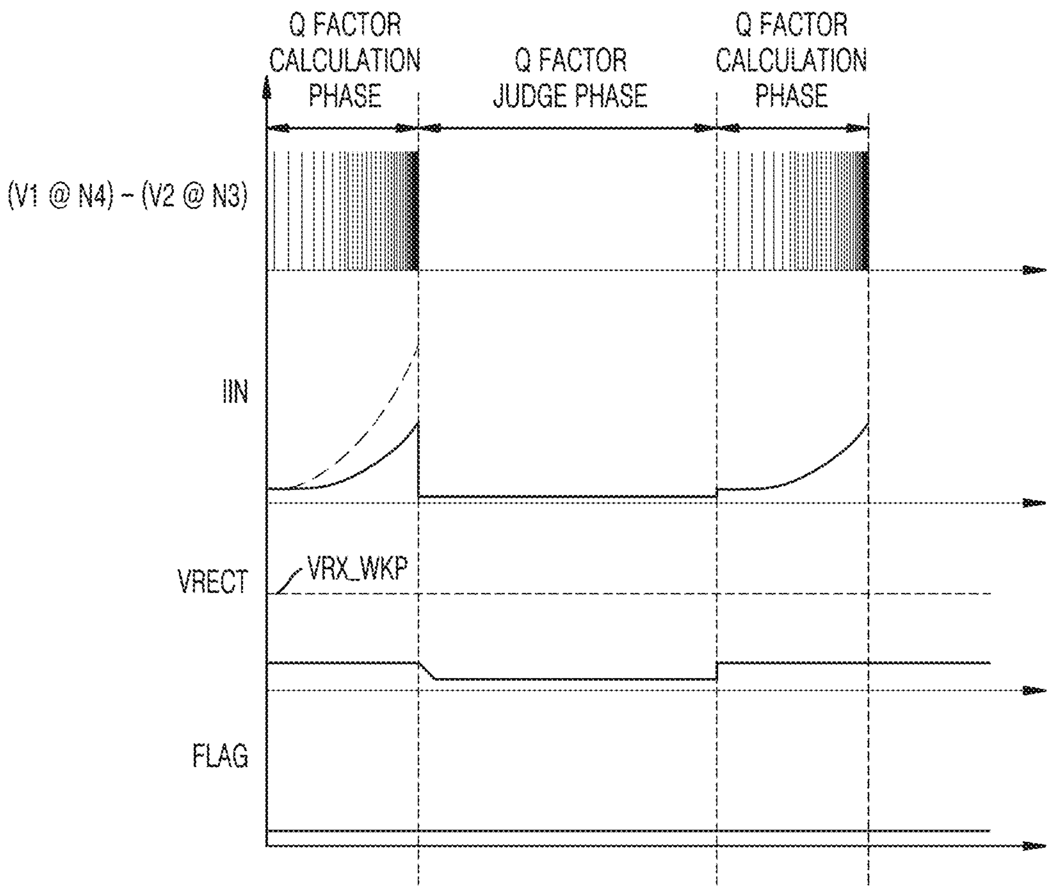

FIGS. 12A and 12B are graphs schematically illustrating a potential difference, an input current, a flag signal, and a rectified voltage applied to a resonant tank according to the example embodiment shown in FIG. 11. In particular, FIG. 12A is a graph showing signals that may occur when there is no foreign object, and FIG. 12B is a graph showing signals that may occur when a foreign object is detected.

Referring to FIGS. 2A, 4 to 6 and 12A, in the first phase (Q FACTOR CALCULATION PHASE), a potential difference between the first voltage V1 @ N4 and the second voltage V2 @ N3 is provided to the TX resonant tank 220 as a test signal, and accordingly, the input current IIN may be sensed. When the sign of the slope of the input current IIN is changed, the test resonance frequency Fres may be searched, and when the input current IIN @ Fres at the test resonance frequency is sensed, the input current at the cut-off frequency IIN @ FL or IIN @ FH may also be identified. The description of the rectified voltage VRECT and the flag signal FLAG is the same or substantially the same as described above with reference to FIGS. 10A and 10B.

Descriptions of the second phase (Q FACTOR JUDGE PHASE) and the third phase (DIGITAL PING OPERATION PHASE) are the same or substantially the same as those described above with reference to FIGS. 10A and 10B.

On the other hand, referring to FIGS. 2A, 4 to 6 and 12B, if there is a foreign object, in the first phase (Q FACTOR CALCULATION PHASE), the greatest value of the input current IIN is smaller than the greatest value of the input current IIN shown in FIG. 12A, and in the second phase (Q FACTOR JUDGE PHASE), if it is determined that the quality factor is smaller than the reference quality factor, the first phase (Q FACTOR CALCULATION PHASE) and the second phase (Q FACTOR JUDGE PHASE) are repeated until the foreign object is removed.

FIG. 13 is a flowchart for explaining another example embodiment of calculating a quality factor.

Referring to FIGS. 4 and 13, in operation S400, the controller 340 sets the test frequency Ft of the test signal to the resonance frequency Fdgn of the previously designed resonant tank, sets the bandwidth BW of the test signal to a previously designed bandwidth BWdgn, and sets the test duty ratio D of the test signal to the test duty ratio Dt. The resonance frequency Fdgn is referred to as a first test frequency, the predesigned bandwidth BWdgn is referred to as a first bandwidth, and a first signal having the first test frequency is referred to as a first test signal.

In operation S411, the converter circuit 350 applies a first test signal to the TX resonant tank 360, and the current sensing circuit 320 senses the input current IIN, and the controller 340 stores a first sensed value corresponding to the sensed input current.

In operation S412, the controller 340 sets the test frequency of the test signal as the cut-off frequency. At this time, the cut-off frequency is greater than the resonance frequency Fdgn of the previously designed resonant tank. The cut-off frequency is referred to as the first cut-off frequency. In particular, the controller 340 calculates a first cut-off frequency greater than the resonance frequency Fdgn by adding half (½) of the pre-designed bandwidth BWdgn to the resonance frequency Fdgn of the pre-designed resonant tank. The first cut-off frequency is set as the second test frequency.

In operation S413, the converter circuit 350 applies a second test signal to the TX resonant tank 360, and the current sensing circuit 320 senses the input current IIN, and the controller 340 stores a second sensed value corresponding to the sensed input current.

In operation S414, the controller 340 compares the first sensed value with the second sensed value. In particular, the controller 340 checks whether the first sensed value is smaller than the second sensed value. When only a foreign object exists with respect to the wireless power transmission device 100, the current according to the frequency may be expressed as a spectrum, as shown in FIG. 3 (with foreign object). A case where the second sensed value is greater than the first sensed value corresponds to a case where only the wireless power transmission device 100 and the foreign object are magnetically coupled, such that this has the effect of detecting foreign objects faster.

If the first sensed value is smaller than the second sensed value (S414, YES), the test frequency is reset while operation S400 is performed.

Until the first sensed value is greater than or equal to the second sensed value, setting the test frequency (e.g., operation S400), storing the first sensed value (e.g., operation S411), setting the second test frequency (e.g., operation S412), and storing the second sensed value (e.g., operation S413) are repeated.

If the first sensed value is greater than or equal to the second sensed value (S414, NO), in operation S420, the controller 340 subtracts a frequency step of a pre-stored (or alternatively, stored, desired, specified, etc.) positive number from the frequency when the first sensed value is greater than or equal to the second sensed value. For example, the controller 340 subtracts a pre-stored positive frequency step Fstep from the first cut-off frequency.

In operation S421, the converter circuit 350 applies a signal having the subtracted frequency to the TX resonant tank 360 as a test frequency, and the current sensing circuit 320 senses an input current, and the controller 340 stores a sensed value corresponding to the sensed input current. In this case, the sensed value corresponding to the sensed input current is referred to as a second sensed value. Operation S421 is the same or substantially the same as operation S210 described above with reference to FIG. 9 or S310 described above with reference to FIG. 11.

In operation S422, the converter circuit 350 calculates the amount of change in the sensed input current per unit time using the second sensed value. Operation S422 is the same or substantially the same as operation S320 described above with reference to FIG. 11.

Operation S423 is the same as operation S330 described above with reference to FIG. 11. That is, depending on whether the sign of the slope is changed, a frequency step is subtracted from the subtracted frequency, or a quality factor is calculated based on the subtracted frequency and a sensed value. If the sign of the slope is constant (S423, NO), operation S420 is performed. Until the sign is changed, subtracting the positive frequency step (e.g., operation S420), storing the sensed value (e.g., operation S421), and calculating the amount of change per unit time (e.g., operation S422) are repeated.

If the sign of the slope is changed (S423, YES), in operation S424, the controller 340 sets the input current corresponding to the stored sensed value as the greatest input current, and sets the test frequency as the test resonance frequency when the greatest input current is sensed. Operation S424 is the same as operation S350 described above with reference to FIG. 11.

Operations S425 and S426 are the same or substantially the same as operations S360 and S370 described above with reference to FIG. 11. At this time, when the input current corresponding to the sensed value smaller by 3 dB than the stored sensed value is sensed when the sign is changed, that test frequency is referred to as the second cut-off frequency, and the bandwidth calculated using the second cut-off frequency and the test resonance frequency is referred to as a second bandwidth.

As described above, there is a benefit that a foreign object may be detected more quickly.

Figure 14A:
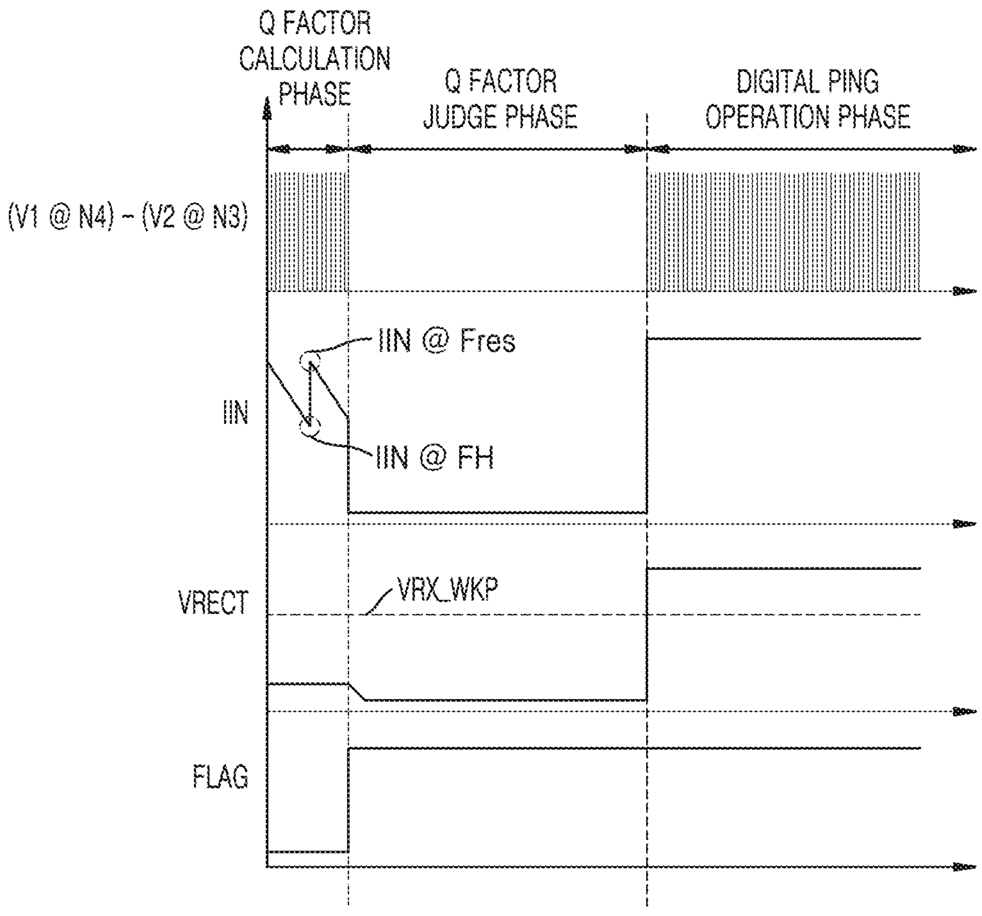
FIGS. 14A and 14B are graphs schematically illustrating a potential difference, an input current, a flag signal, and a rectified voltage applied to a resonant tank according to the example embodiment shown in FIG. 11.
Figure 14B:
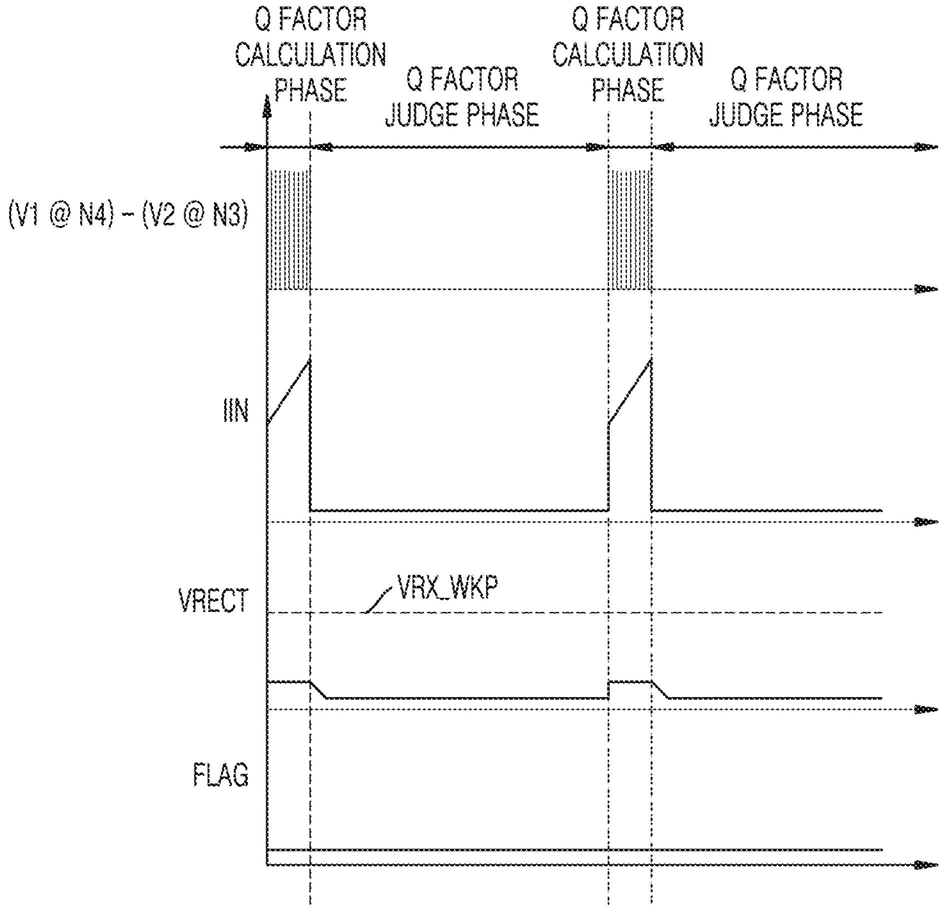

FIGS. 14A and 14B are graphs schematically illustrating a potential difference, an input current, a flag signal, and a rectified voltage applied to a resonant tank according to the example embodiment shown in FIG. 11. In particular, FIG. 14A is a graph showing signals that may occur when there is no foreign object, and FIG. 14B is a graph showing signals that may occur when a foreign object is detected.

Referring to FIGS. 2A, 4 to 6 and 14A, in the first phase (Q FACTOR CALCULATION PHASE), the input current at the test resonance frequency IIN @ Fres and the input current at the cut-off frequency (e.g., IIN @ FH) may also be identified. The rectified voltage VRECT, the flag signal FLAG, the second phase (Q FACTOR JUDGE PHASE), and the third phase (DIGITAL PING OPERATION PHASE) have been described above with reference to FIGS. 10A and 10B.

Meanwhile, referring to FIGS. 2A, 4 to 6 and 14B, if there is a foreign object, the first phase (Q FACTOR CALCULATION PHASE) and the second phase (Q FACTOR JUDGE PHASE) are repeated until the foreign object is removed.

Figure 15:
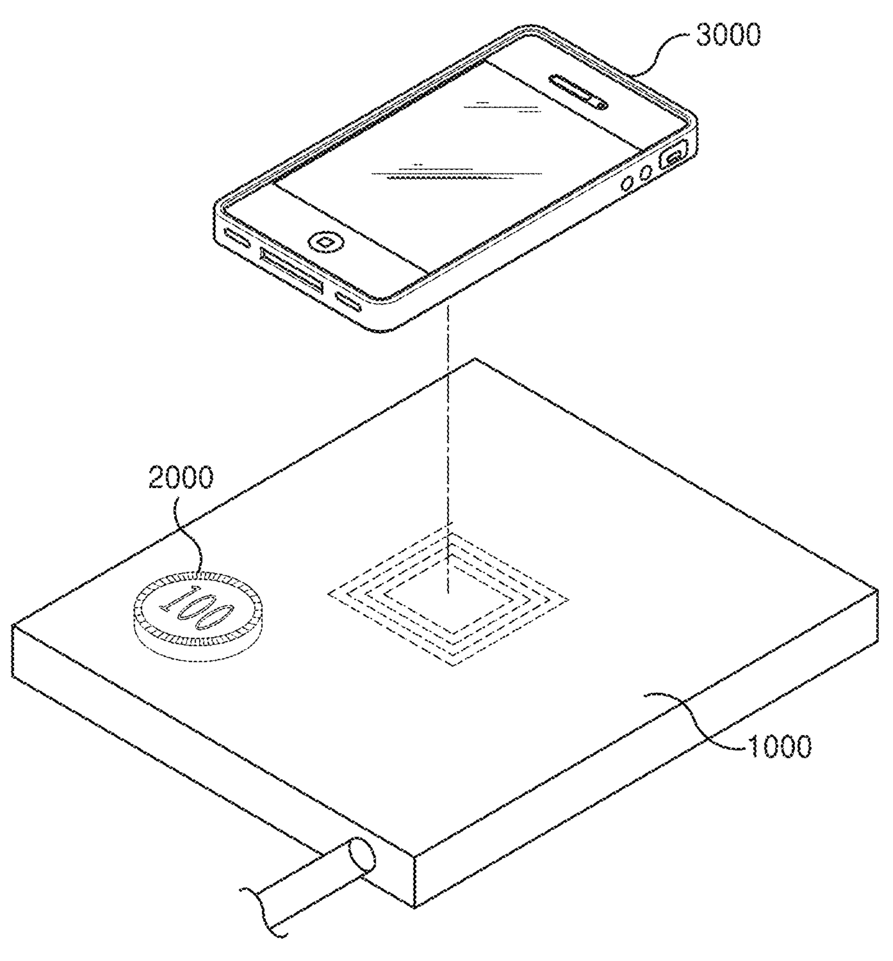
FIG. 15 is a diagram schematically illustrating a wireless power transmission device, an electronic device including a wireless power reception device, and a foreign object.

FIG. 15 is a diagram schematically illustrating a wireless power transmission device, an electronic device including a wireless power reception device, and a foreign object.

Referring to FIG. 15, a foreign object 2000 may exist on the wireless power transmission device 1000. The foreign object 2000 may be a metal coin, but is not limited thereto. The electronic device 3000 may include the wireless power reception device 110 described above with reference to FIG. 1. When the wireless power transmission device 1000, the foreign object 2000, and the electronic device 3000 are magnetically coupled, the wireless power transmission device 1000 may detect the presence of the foreign object 2000 based on the quality factor. Until the foreign object 2000 is removed from the wireless power transmission device 1000, the wireless power transmission device 1000 may stop transmitting wireless power to the electronic device 3000.

As described above, by implementing a test signal for detecting a foreign object without adding additional hardware, there is an effect of reducing manufacturing cost and promoting integration.

In addition, as described above, there is an effect of inhibiting or preventing an accident due to heat by quickly and accurately detecting a foreign object in the wireless charging system.

Figure 16:
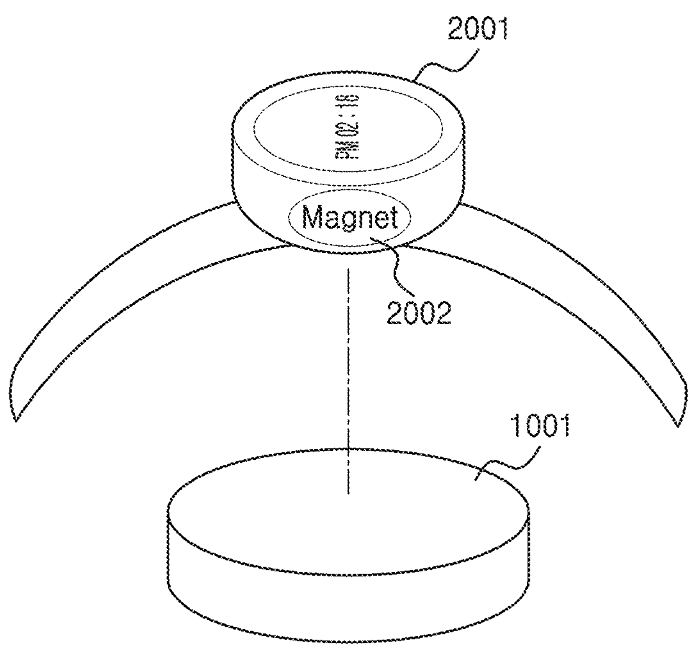
FIG. 16 is a diagram schematically illustrating a wireless power transmission device, an electronic device including a wireless power reception device, and a magnetic member.

FIG. 16 is a diagram schematically illustrating a wireless power transmission device, an electronic device including a wireless power reception device, and a magnetic member.

Referring to FIG. 16, a wireless power reception device 2001 may exist on a wireless power transmission device 1001. The wireless power reception device 2001 may be, for example, a wearable electronic device such as a smart watch. The wireless power reception device 2001 may include a magnetic member 2002. The magnetic member 2002 may be, for example, a magnet, but is not limited thereto, and may mean an entire member made of a magnetic material. When the wireless power reception device 2001 includes the magnetic member 2002, the wireless power transmission device 1001 and the wireless power reception device 2001 may be more easily coupled. When the wireless power transmission device 1001 and the wireless power reception device 2001 are easily coupled, a wireless charging operation may be easily performed between the wireless power transmission device 1001 and the wireless power reception device 2001. Meanwhile, the wireless power reception device 2001 may also include the same or substantially the same material as the magnetic member 2002.

The wireless power transmission device 1001 may perform an operation (e.g., a foreign object detection operation) performed by the wireless power transmission device 100 described above with reference to FIG. 1. However, when the wireless power reception device 2001 includes the magnetic member 2002, the wireless power transmission device 1001 may detect the magnetic member 2002 as a foreign object. It is desirable or necessary to inhibit or prevent the magnetic member 2002 from being detected as a foreign object.

Figure 17A:
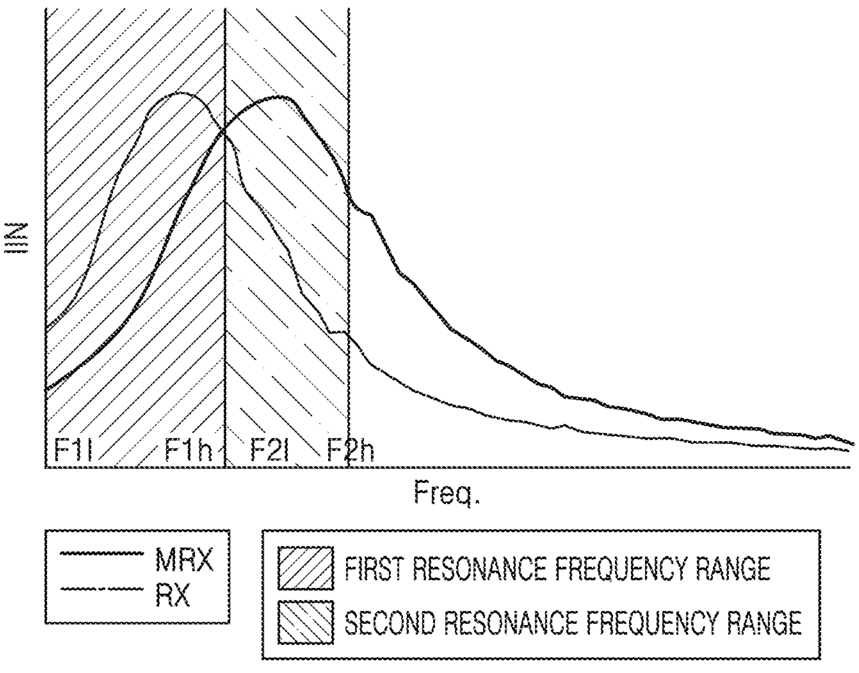
FIG. 17A is a graph schematically showing a coil current according to the presence or absence of a magnetic member according to frequency in a wireless power reception device.
Figure 17B:
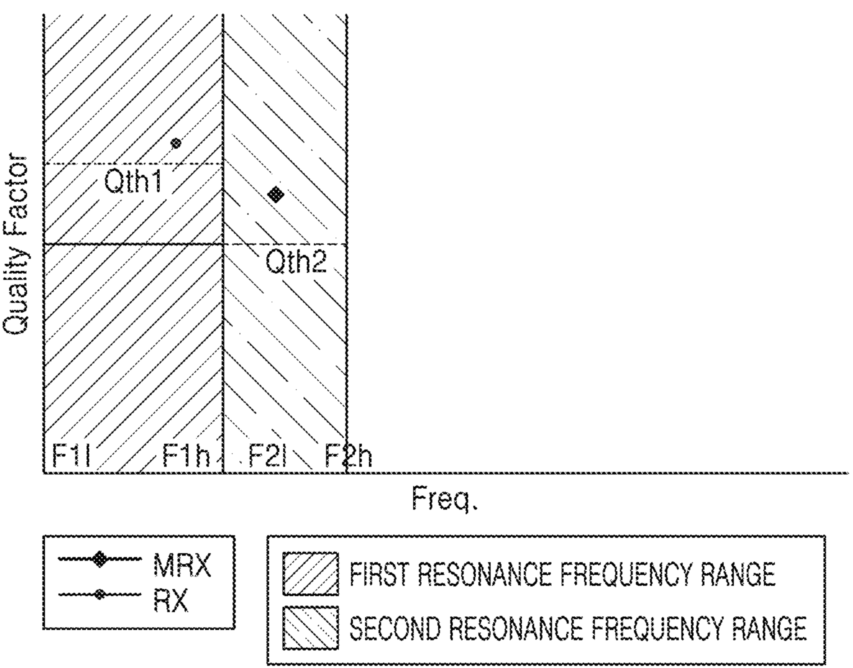
FIG. 17B is a graph schematically showing a quality factor according to the presence or absence of a magnetic member according to frequency in a wireless power reception device.

FIG. 17A is a graph schematically showing a coil current according to the presence or absence of a magnetic member according to frequency in a wireless power reception device, and FIG. 17B is a graph schematically showing a quality factor according to the presence or absence of a magnetic member according to frequency in a wireless power reception device.

Referring to FIGS. 3, 16 and 17A, when the wireless power reception device 2001 does not include the magnetic member 2002 and a foreign object is not around the wireless power transmission device 1001 (e.g., refer to RX shown in FIG. 17A), the input current IIN generated in the wireless power transmission device 1001 may be expressed as a first spectrum according to frequency, similar to that described above with reference to FIG. 3. In some example embodiments, the resonance frequency for the input current IIN may be included in the first resonance frequency range. In an example embodiment, the smallest value of the first resonance frequency range may be “F1l”, and the greatest value of the first resonance frequency range may be “F1h”. “F1l” and “F1h” may be natural numbers.

When the wireless power reception device 2001 includes a magnetic member 2002 and a foreign object is not around the wireless power transmission device 1001 (e.g., see MRX shown in FIG. 17A), the input current IIN generated in the wireless power transmission device 1001 may be expressed as a second spectrum. In some example embodiments, the resonance frequency for the input current IIN may be included in the second resonance frequency range. In an example embodiment, the smallest value of the second resonance frequency range may be “F2l”, and the greatest value of the second resonance frequency range may be “F2h”. “F2l” and “F2h” may be natural numbers.

The greatest value of the first resonance frequency range (e.g., “F1h”) may be less than or equal to the smallest value of the second resonance frequency range (e.g., “F2l”). For example, the greatest value (e.g., “F1h”) of the first resonance frequency range may be equal to the smallest value (e.g., “F2l”) of the second resonance frequency range.

Depending on whether the wireless power reception device 2001 includes the magnetic member 2002, a resonance frequency for the input current IIN may vary. Therefore, if there is no foreign object other than the magnetic member 2002, when the resonance frequency for the input current IIN is obtained, it may be checked whether the wireless power reception device 2001 includes the magnetic member 2002.

Referring to FIG. 17B, when a foreign object is not around the wireless power transmission device 1001, a quality factor when the wireless power reception device 2001 does not include a magnetic member 2002 (e.g., see RX shown in FIG. 17B) may be relatively larger than a quality factor (e.g., see MRX shown in FIG. 17B) when the wireless power reception device 2001 includes the magnetic member 2002.

When it is checked whether the wireless power reception device 2001 includes the magnetic member 2002 using the resonance frequency for the input current IIN, it is desirable to set the value of the standard quality factor for identifying foreign objects differently. When the wireless power reception device 2001 includes the magnetic member 2002, it is desirable to set the value of the reference quality factor relatively low in order not to detect the magnetic member 2002 as a foreign object. For example, the first reference quality factor Qth1 when the wireless power reception device 2001 does not include the magnetic member 2002 (e.g., refer to RX shown in FIG. 17B) may be set to be greater than or equal to the second reference quality factor Qth2 when the wireless power reception device 2001 includes the magnetic member 2002 (e.g., refer to MRX illustrated in FIG. 17B).

Figure 18A:
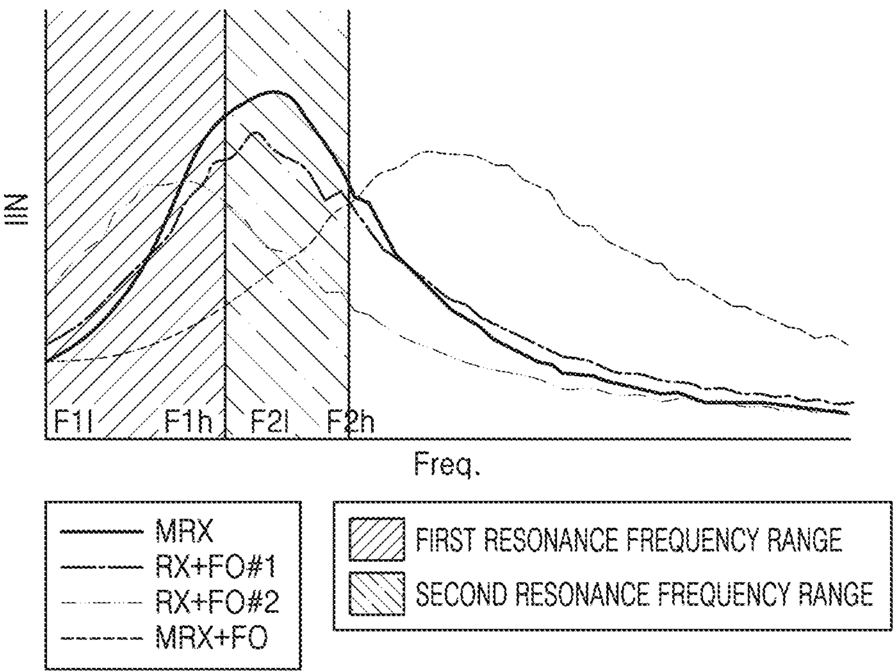
FIG. 18A is a graph schematically showing coil current according to the presence or absence of a magnetic member and the presence or absence of a foreign object in a wireless power reception device according to frequency.
Figure 18B:
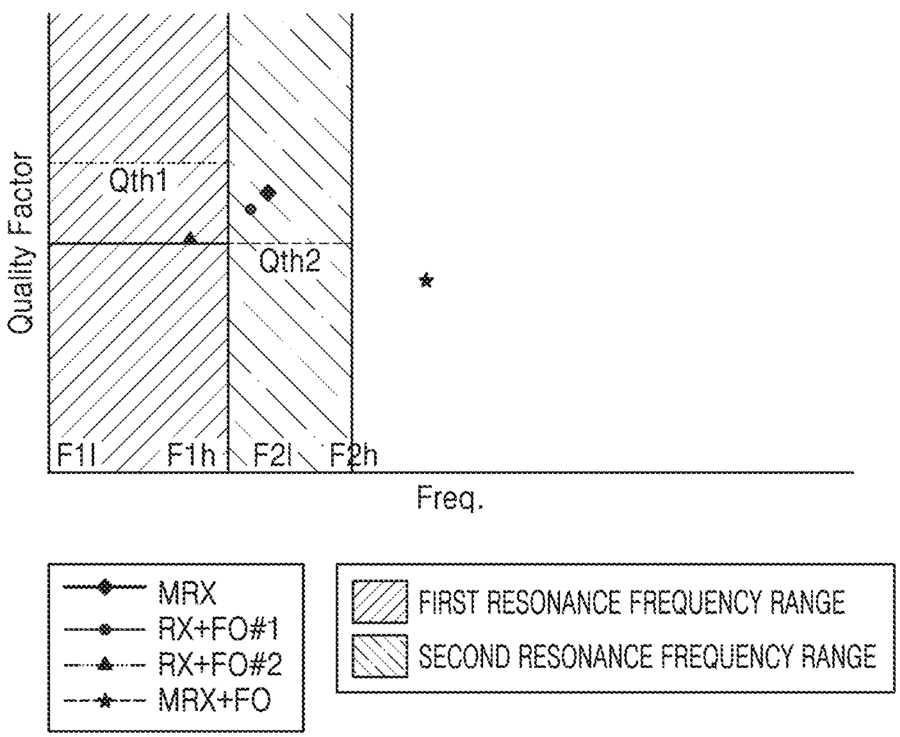
FIG. 18B is a graph schematically illustrating a quality factor according to the presence or absence of a magnetic member and the presence or absence of a foreign object in a wireless power reception device according to frequency.

FIG. 18A is a graph schematically showing coil current according to the presence or absence of a magnetic member and the presence or absence of a foreign object in a wireless power reception device according to frequency, and FIG. 18B is a graph schematically illustrating a quality factor according to the presence or absence of a magnetic member and the presence or absence of a foreign object in a wireless power reception device according to frequency.

Referring to FIGS. 3, 16, 17A and 18A, when the wireless power reception device 2001 includes a magnetic member 2002 and there is no foreign object around the wireless power transmission device 1001, the input current IIN is the same as that in FIG. 17A (e.g., see MRX shown in FIG. 18A). When the wireless power reception device 2001 includes a magnetic member 2002 and a foreign object exists around the wireless power transmission device 1001 (e.g., see MRX+FO shown in FIG. 18A), the resonance frequency for the input current IIN may be greater than the greatest value (e.g., “F2h”) of the second resonance frequency range. In some example embodiments, if the resonance frequency for the input current IIN is greater than the greatest value of the second resonance frequency range (e.g., “F2h”), it may be determined that the wireless power transmission device 1001 has detected a foreign object. Even if the resonance frequency for the input current IIN is included in the second resonance frequency range, a foreign object may exist around the wireless power transmission device 1001.

When the wireless power reception device 2001 does not include the magnetic member 2002 and a foreign object exists around the wireless power transmission device 1001, the resonance frequency for the input current IIN may be included in the first resonance frequency range (e.g., see RX+FO#2 illustrated in FIG. 18A). Alternatively, when the wireless power reception device 2001 does not include the magnetic member 2002 and a foreign object exists around the wireless power transmission device 1001, the resonance frequency for the input current IIN may be included in the second resonance frequency range (e.g., refer to RX+FO#1 shown in FIG. 18A).

Referring to FIG. 18B, when the wireless power reception device 2001 includes a magnetic member 2002 and a foreign object is not around the wireless power transmission device 1001, the quality factor for the input current IIN is the same or substantially the same as that in FIG. 17B (e.g., see MRX shown in FIG. 18B).

When the wireless power reception device 2001 includes a magnetic member 2002 and a foreign object exists around the wireless power transmission device 1001, the quality factor for the input current IIN may be smaller than the second reference quality factor Qth2 as shown in FIG. 18B (e.g., refer to MRX+FO shown in FIG. 18B).

When the wireless power reception device 2001 does not include the magnetic member 2002 and a foreign object exists around the wireless power transmission device 1001, the resonance frequency for the input current IIN may be included in the first resonance frequency range (e.g., see RX+FO#2 illustrated in FIG. 18B). In this case, the quality factor for the input current IIN may be smaller than the first reference quality factor Qth1.

In some example embodiments, when the wireless power reception device 2001 does not include the magnetic member 2002 and a foreign object exists around the wireless power transmission device 1001, the resonance frequency for the input current IIN may be included in the second resonance frequency range (e.g., refer to RX+FO#1 shown in FIG. 18B). In addition, the quality factor for the input current IIN may be greater than the second reference quality factor Qth2. In a situation where the resonance frequency for the input current IIN is included in the second resonance frequency range, if the wireless power transmission device 1001 compares the quality factor with respect to the input current IIN and the second reference quality factor Qth2 to determine whether a foreign object is detected, a misjudgment may occur.

Figure 19A:
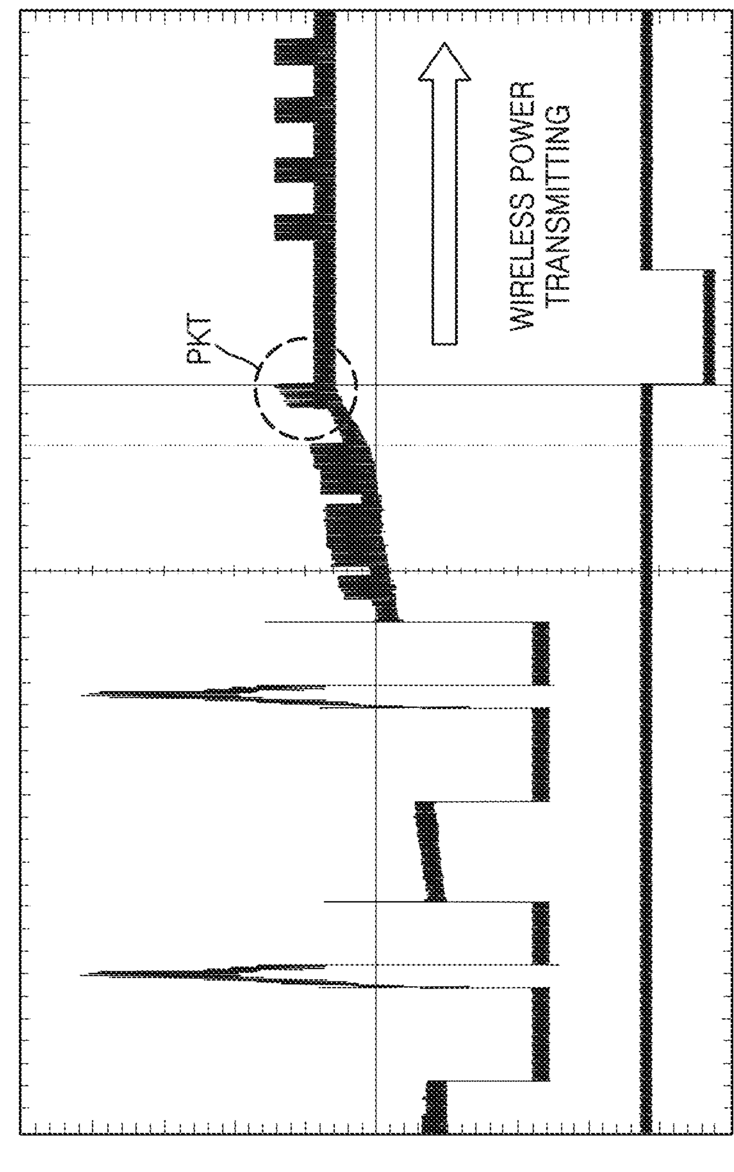
FIGS. 19A and 19B are graphs schematically illustrating an operation of transmitting wireless power that may be performed according to whether a packet is received from a wireless power reception device.
Figure 19B:
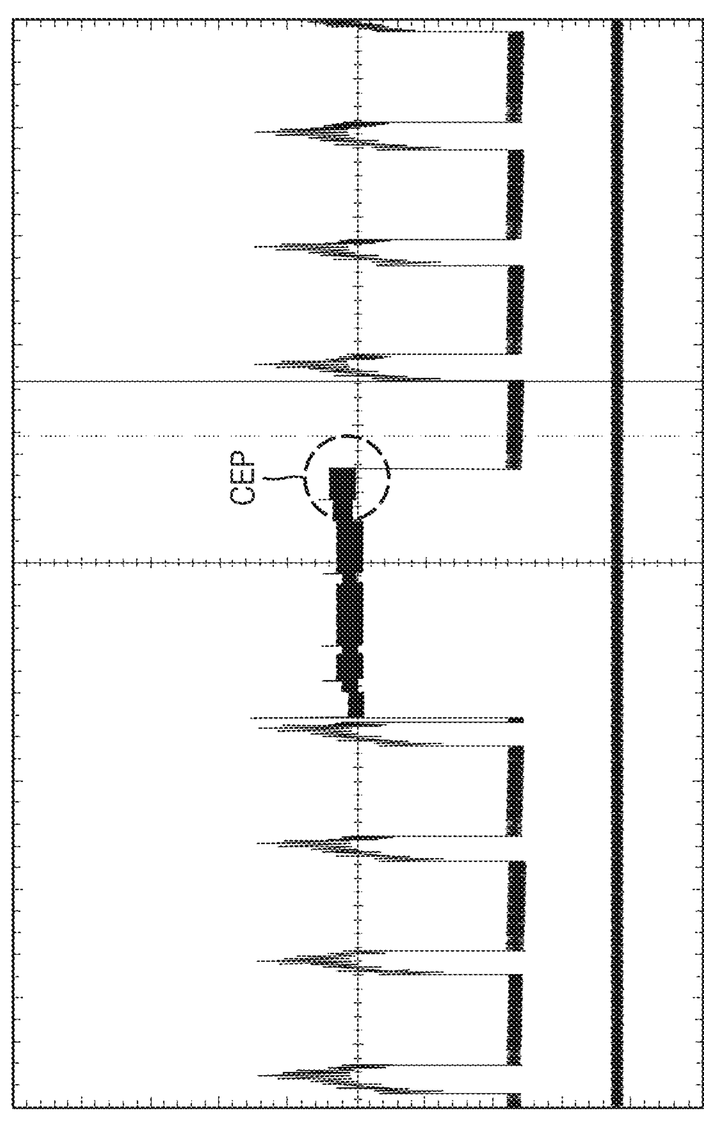

FIGS. 19A and 19B are graphs schematically illustrating an operation of transmitting wireless power that may be performed according to whether a packet is received from a wireless power reception device.

Referring to FIGS. 18A, 18B and 19A, the operating phases of the wireless power transmission device 1001 and the wireless power reception device 2001 for wireless power transmission may be divided into a selection phase, a ping phase, an identification and configuration phase, and a power transfer phase.

In some example embodiments, the wireless power reception device 2001 may include a magnetic member 2002 (e.g., a magnet), and in some example embodiments, the wireless power reception device 2001 may transmit a packet PKT indicating that it is a reception device including the magnetic member 2002 in the power transmission state to the wireless power transmission device 1001. After receiving the packet PKT, the wireless power transmission device 1001 may continue to transmit wireless power (e.g., see "WIRELESS POWER TRANSMITTING" shown in FIG. 19A).

As described above with reference to FIGS. 18A and 18B (e.g., see MRX shown in FIG. 18B), when the resonance frequency for the input current IIN is included in the second resonance frequency range and the quality factor for the input current IIN is greater than the second reference quality factor Qth2, since the wireless power reception device 2001 may transmit the aforementioned packet PKT to the wireless power transmission device 1001, the wireless power transmission device 1001 may detect a foreign object with respect to the wireless power reception device 2001 including the magnetic member 2002 according to whether a packet PKT is received.

Referring to FIGS. 1 and 19B, in some example embodiments, the wireless power reception device 2001 may transmit a signal CEP including a control error packet to the wireless power transmission device 1001 in a power transmission state. The wireless power transmission device 1001 may stop transmitting wireless power in response to the signal CEP including the control error packet. And, the wireless power transmission device 1001 may reset the test signal.

As described above with reference to FIGS. 18A and 18B (e.g., see RX+FO#1 shown in FIG. 18B), when the resonance frequency for the input current IIN is included in the second resonance frequency range and the quality factor for the input current IIN is greater than the second reference quality factor Qth2, since the wireless power reception device 2001 may not transmit the aforementioned packet PKT to the wireless power transmission device 1001 or transmit a signal CEP including the aforementioned control error packet to the wireless power transmission device 1001, the wireless power transmission device 1001 may detect a foreign object according to whether a signal CEP including a control error packet is received (or whether the aforementioned packet PKT is not received).

Figure 20:
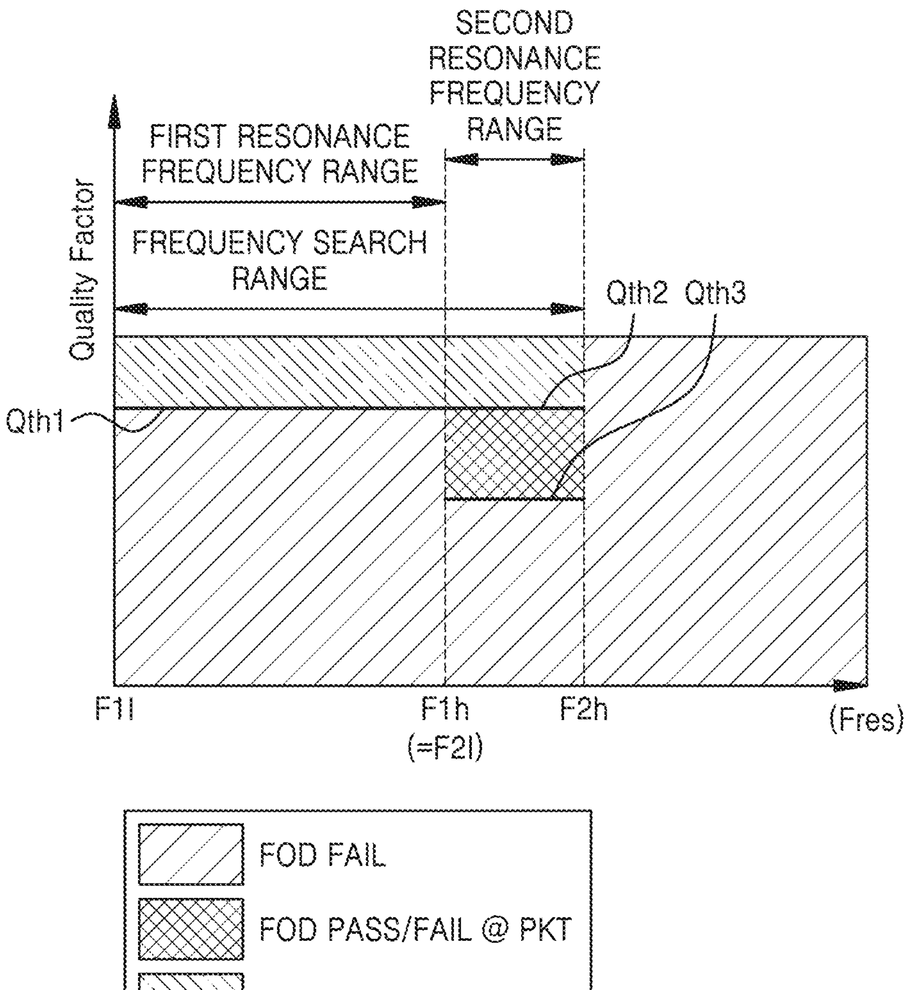
FIG. 20 is a graph schematically illustrating whether detection of a foreign object has passed or failed.

FIG. 20 is a graph schematically illustrating whether detection of a foreign object has passed or failed.

Referring to FIG. 20, a foreign object detection pass area FOD PASS may be an area in which a foreign object is not detected. In the case of foreign object detection pass area FOD PASS, a resonance frequency may be included in the first resonance frequency range (e.g., "F1l" to "F1h") and the quality factor may be greater than or equal to the first reference quality factor Qth1.

The foreign object detection fail area FOD FAIL may be an area in which a foreign object is detected. In the case of foreign object detection fail area FOD FAIL, a resonance frequency may be included in the first resonance frequency range (e.g., "F1l" to "F1h") and the quality factor may be smaller than the first reference quality factor Qth1. Alternatively, in the case of a foreign object detection fail area FOD FAIL, the resonance frequency may be included in the second resonance frequency range (e.g., "F1h" (or "F2l") to "F2h") and the quality factor may be smaller than the third reference quality factor Qth3. Alternatively, in the case of the foreign object detection fail area FOD FAIL, the resonance frequency may be greater than the greatest value (e.g., "F2h") of the second resonance frequency range.

The first reference quality factor Qth1 may be greater than or equal to the second reference quality factor Qth2, and the second reference quality factor Qth2 may be greater than the third reference quality factor Qth3.

The foreign object detection pass/fail area FOD PASS/FAIL @ PKT may be an area in which a foreign object is detected or not according to whether the wireless power transmission device 1001 receives the packet PKT described above with reference to FIG. 19A from the wireless power reception device 2001. In the foreign object detection pass/fail area FOD PASS/FAIL @ PKT, the resonance frequency is included in the second resonance frequency range (e.g., “F1h” (or “F2l”) to “F2h”), and the quality factor may be less than the second reference quality factor Qth2 and greater than or equal to the third reference quality factor Qth3.

In some example embodiments, the frequency search range may include a first resonance frequency range (e.g., “F1l” to “F1h”) and a second resonance frequency range (e.g., “F1h” (or “F2l”) to “F2h”).

Hereinafter, an operation method of the wireless power transmitter for detecting a foreign object according to whether the wireless power reception device 2001 includes the magnetic member 2002 will be described.

Figure 21:
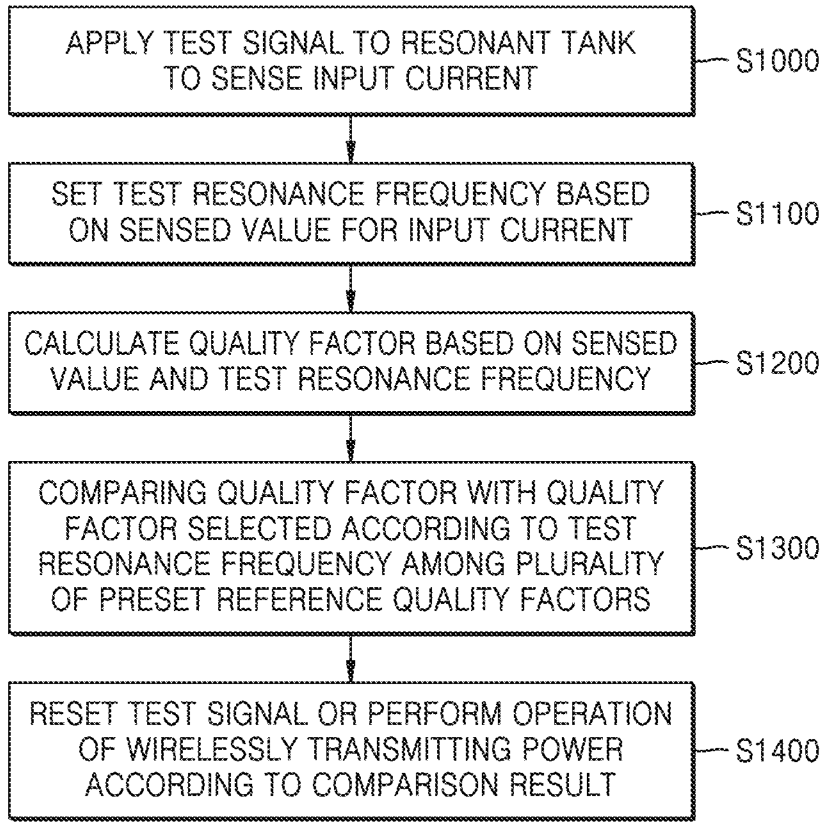
FIG. 21 is a flowchart for explaining a method of operating a wireless power transmitter, according to another example embodiment of the present inventive concepts.

FIG. 21 is a flowchart for explaining a method of operating a wireless power transmitter, according to another example embodiment of the present inventive concepts.

Referring to FIG. 21, the operating method of the wireless power transmitter may include sensing the input current by applying a test signal to the resonant tank S1000, setting the test resonance frequency based on the sensed value for the input current S1100, calculating a quality factor based on the sensed value and the test resonance frequency S1200, comparing the quality factor with a reference quality factor selected according to a test resonance frequency among a plurality of preset reference quality factors S1300, and resetting the test signal or performing an operation of wirelessly transmitting power according to the comparison result S1400.

Operation S1000 is, for example, as described above with reference to operations S200 and S210 shown in FIG. 9.

Operation S1100 is, for example, as described above with reference to operations S220, S230, and S240 shown in FIG. 9.

Operation S1200 is, for example, as described above with reference to operations S250 and S260 shown in FIG. 9.

In operation S1300, if the test resonance frequency is included in the first resonance frequency range as described above with reference to FIG. 20, the selected reference quality factor may be the first reference quality factor (e.g., Qth1 shown in FIG. 20). When the test resonance frequency is included in the second resonance frequency range, as described above with reference to FIG. 20, the selected reference quality factor may be a second reference quality factor (e.g., Qth2 illustrated in FIG. 20) or a third reference quality factor (e.g., Qth3 illustrated in FIG. 20).

Operation S1400 is the same as described above with reference to operations S100, S120, and S130 shown in FIG. 8.

Figure 22:
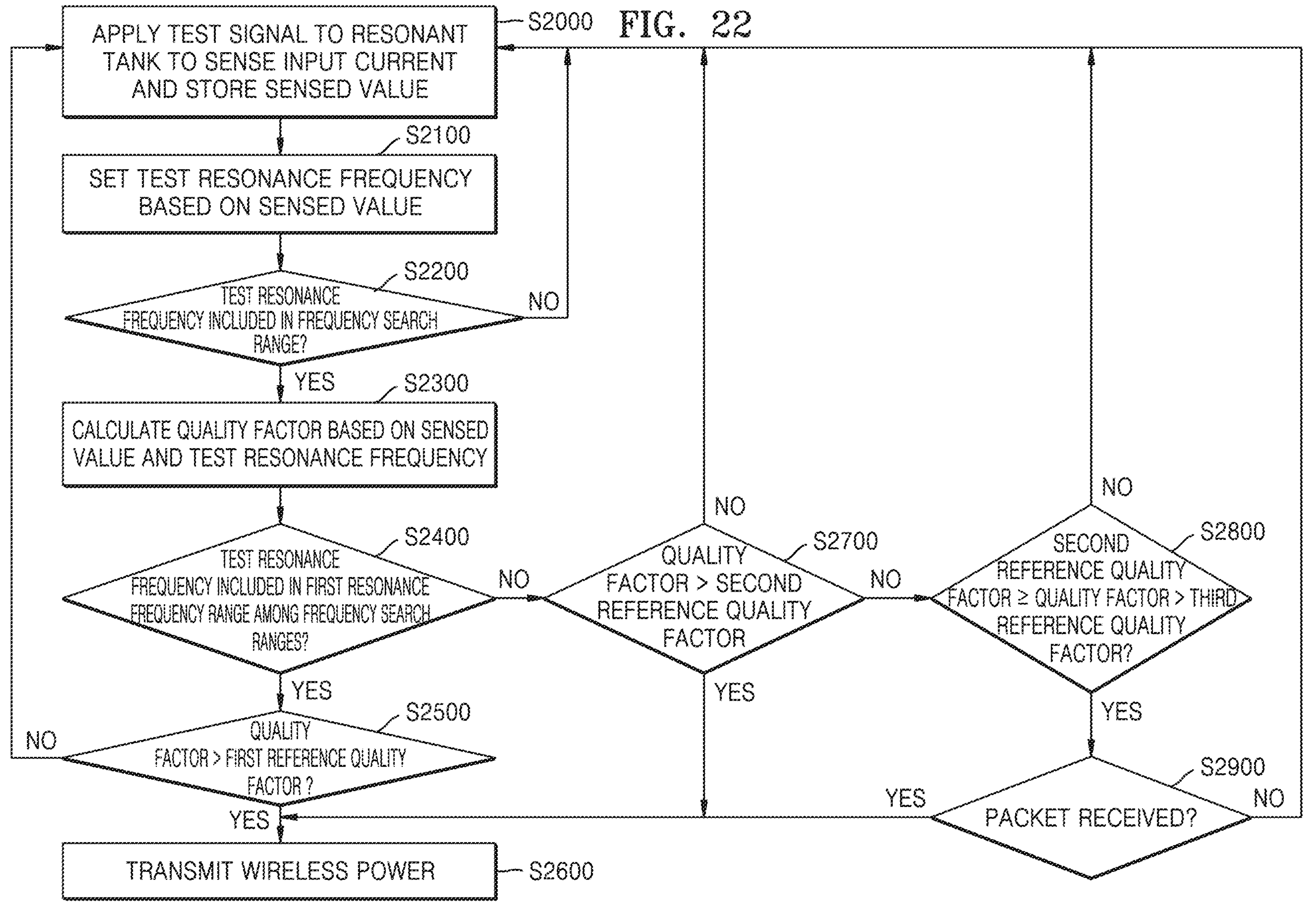
FIG. 22 is a flowchart for describing in detail an operation method of the wireless power transmitter shown in FIG. 21.

FIG. 22 is a flowchart for describing in detail an operation method of the wireless power transmitter shown in FIG. 21.

Referring to FIGS. 20, 21, and 22, operation S2000 is, for example, the same as operation S210 described above with reference to FIG. 9.

Operation S2100 is, for example, the same or substantially the same as operations S220, S230, and S240 described above with reference to FIG. 9. Alternatively, in another example embodiment, operation S2100 is the same or substantially the same as operation S320, operation S330, operation S340, and operation S350 described above with reference to FIG. 11.

The wireless power transmitter (e.g., the wireless power transmission device 100 shown in FIG. 1) checks whether the test resonance frequency is included in a preset frequency search range S2200. The frequency search range may include, as described above with reference to FIG. 20, a first resonance frequency range (e.g., “F1l” to “F1h”) and a second resonance frequency range (e.g., “F1h” (or “F2l”) to “F2h”).

The test resonance frequency may be a frequency greater than a frequency search range (e.g., “F1l” to “F2h” illustrated in FIG. 20). That is, if the test resonance frequency is not included in the frequency search range (S2200, NO), operation S2000 is performed.

If the test resonance frequency is included in the frequency search range (S2200, YES), operation S2300 is performed. Operation S2300 is the same or substantially the same as operation S1200 described above with reference to FIG. 21.

The wireless power transmitter determines whether the test resonance frequency is included in the first resonance frequency range (e.g., “F1l” to “F1h” shown in FIG. 20) S2400.

When the test resonance frequency is included in the first resonance frequency range (S2400, YES), the wireless power transmitter compares whether the quality factor is greater than a first reference quality factor (e.g., the first reference quality factor Qth1 illustrated in FIG. 20) S2500.

If the quality factor is less than or equal to the first reference quality factor (S2500, NO), operation S2000 is performed.

If the quality factor is greater than the first reference quality factor (S2500, YES), operation S2600 is performed. Operation S2600 is, for example, the same or substantially the same as operation S130 described above with reference to FIG. 8.

If the test resonance frequency is not included in the first resonance frequency range (S2400, NO), that is, the test resonance frequency is in the second resonance frequency range (e.g., “F1h” (or “F2l”) to “F2h” shown in FIG. 20), the wireless power transmitter compares whether the quality factor is greater than a second reference quality factor (e.g., the second reference quality factor Qth2 illustrated in FIG. 20) S2700. The second reference quality factor may be less than or equal to the first reference quality factor. Referring to FIG. 20, for example, the second reference quality factor Qth2 may be the same as the first reference quality factor Qth1. However, the inventive concepts are not limited thereto.

If the quality factor is greater than the second reference quality factor (S2700, YES), operation S2600 is performed.

If the quality factor is less than or equal to the second reference quality factor (S2700, NO), the wireless power transmitter compares whether the quality factor is greater than the third reference quality factor S2800. The third reference quality factor Qth3 may be, for example, smaller than the second reference quality factor Qth2 with reference to FIG. 20.

If the quality factor is greater than the third reference quality factor (S2800, YES), the wireless power transmitter checks whether a packet (e.g., the packet PKT illustrated in FIG. 19A) is received from the outside (e.g., the wireless power reception device 2001 shown in FIG. 16) S2900.

When the packet is received (S2900, YES), operation S2600 is performed. When a packet is not received or a signal including a control error packet (e.g., a signal CEP shown in FIG. 19B) is received (S2900, NO), operation S2000 is performed.

As described above, even when the wireless power reception device 2001 includes the magnetic member 2002, by accurately detecting a foreign object around the wireless power transmission device 1001, there is an effect of inhibiting or preventing malfunctions and accidents due to heat.

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FGPA), a System-on-Chip (SoC), a programmable logic unit, a microprocessor, application-specific integrated circuit (ASIC), etc.

While aspects of the inventive concepts have been particularly shown and described with reference to some example embodiments thereof, it will be understood that various changes in form and details may be made therein without departing from the scope of the inventive concepts.

What is claimed is:

1. A wireless power transmission device for supplying wireless power to a wireless power reception device, the wireless power transmission device comprising:

- a converter circuit configured to generate a test signal based on an input current generated directly from a power source, the test signal having a test frequency;
- a resonant tank configured to transmit wireless power in response to the test signal;
- a current sensing circuit connected to the power source, the current sensing circuit configured to directly sense the input current when the wireless power is transmitted; and
- a controller configured to control the converter circuit to generate the test signal, calculate a quality factor of the resonant tank based on the input current directly sensed by the current sensing circuit, compare the quality factor with a reference quality factor, and control the converter circuit to reset the test frequency or transmit a digital ping signal to the wireless power reception device according to a result of comparing the quality factor with the reference quality factor.

2. The wireless power transmission device of claim 1, wherein the controller is configured to:

- control the converter circuit to sequentially generate a signal having a frequency in a stored frequency range as the test signal,
- sequentially store sensed values corresponding to input currents as signals are sequentially generated,
- set an input current corresponding to a greatest value among the stored sensed values as a greatest input current,
- set the frequency as a test resonance frequency when the greatest input current is sensed,
- calculate at least one cut-off frequency based on the stored sensed values and the greatest input current, and
- calculate the quality factor based on the test resonance frequency and the at least one cut-off frequency.

3. The wireless power transmission device of claim 2, wherein

- the test signal is a square wave having a test duty ratio in a stored duty ratio range, and
- the controller is configured to set the frequency as the at least one cut-off frequency in response to sensing at least one input current corresponding to at least one sensed value that is 3 dB less than the greatest value among the stored sensed values.

4. The wireless power transmission device of claim 1, wherein the controller is configured to:

- control the converter circuit to generate a signal having a stored initial frequency as the test signal,
- store a sensed value corresponding to a specified input current sensed as the signal is generated,
- calculate an amount of change per unit time of the specified input current using the sensed value,
- determine whether a sign of the amount of change per unit time has changed, and
- calculate a frequency step in the initial frequency and reset the calculated frequency step to the test frequency when the sign is constant.

5. The wireless power transmission device of claim 4, wherein, when the sign is changed, the controller is configured to:

- set, as a greatest input current, an input current corresponding to the sensed value stored when the sign is changed,
- set a frequency as a test resonance frequency when the greatest input current is sensed,
- calculate one cut-off frequency based on the stored sensed values and the greatest input current, and
- calculate the quality factor based on the test resonance frequency and the one cut-off frequency.

6. The wireless power transmission device of claim 1, wherein the controller is configured to:

- control the converter circuit to generate, as the test signal, a first signal having a specified resonant tank resonance frequency,
- store a first sensed value corresponding to an input current sensed as the first signal is generated,
- calculate a cut-off frequency greater than the specified resonant tank resonance frequency based on a stored bandwidth and the specified resonant tank resonance frequency,
- control the converter circuit to generate a second signal having the cut-off frequency as the test signal,
- store a second sensed value corresponding to an input current sensed as the second signal is generated, and
- compare the first sensed value with the second sensed value, and reset the test frequency when the first sensed value is less than the second sensed value.

7. The wireless power transmission device of claim 6, wherein the controller, when the first sensed value is greater than or equal to the second sensed value, is configured to:

- subtract a frequency step of a stored positive number in the cut-off frequency,
- control the converter circuit to generate a signal having a subtracted frequency as the test frequency,
- store a sensed value corresponding to an input current sensed as the signal is generated, calculate an amount of change of the sensed input current per unit time using the sensed value, determine whether a sign of the amount of change is changed, and subtract the frequency step from the subtracted frequency according to a determination result or calculate the quality factor based on the subtracted frequency and the sensed value.

8. The wireless power transmission device of claim 7, wherein, if the sign is constant, the controller is configured to:

subtract the frequency step from the subtracted frequency, when the sign is changed, set, as a greatest input current, an input current corresponding to the sensed value stored when the sign is changed, set a frequency as a test resonance frequency when the greatest input current is sensed, calculate one cut-off frequency based on the stored sensed value and the greatest input current, and calculate the quality factor based on the test resonance frequency and the one cut-off frequency.

9. A wireless power transmission device for supplying power to a wireless power reception device, the wireless power transmission device comprising:

a power source connected between a first node and ground;

a current sensing circuit connected between the first node and a second node;

a converter circuit including a first transistor connected between the second node and a third node, a second transistor connected between the second node and a fourth node, a third transistor connected between the third node and the ground, and a fourth transistor connected between the fourth node and the ground;

a resonant tank connected between the third node and the fourth node; and a controller connected to an output terminal of the current sensing circuit, the controller connected to a gate electrode of each of the first to fourth transistors, and the controller configured to output a first switching signal to the gate electrode of the first transistor, output a second switching signal to the gate electrode of the second transistor, output a third switching signal to the gate electrode of the third transistor, and output a fourth switching signal to the gate electrode of the fourth transistor, wherein at least one signal group of a first signal group including the first and third switching signals and a second signal group including the second and fourth switching signals is a square wave having a test frequency and a test duty ratio, and wherein a phase difference between two switching signals included in the at least one signal group is 180 degrees.

10. The wireless power transmission device of claim 9, wherein the first signal group is the square wave, and one of the second and fourth switching signals has a turn-on level for turning on a transistor, and another one of the second and fourth switching signals has a turn-off level.

11. The wireless power transmission device of claim 10, wherein a first voltage applied to the fourth node is a voltage level of the ground, and a second voltage applied to the third node is a square wave having the test frequency.

12. The wireless power transmission device of claim 11, wherein, when a voltage level of the first switching signal is a turn-on level, a voltage level of the second switching signal is a turn-off level, a voltage level of the third switching signal is a turn-off level, and a voltage level of the fourth switching signal is a turn-on level, the voltage level of the first voltage is lower than the voltage level of the second voltage, and when the voltage level of the first switching signal is a turn-off level, the voltage level of the second switching signal is a turn-off level, the voltage level of the third switching signal is a turn-on level, and the voltage level of the fourth switching signal is a turn-on level, the voltage level of the first voltage is the same as the voltage level of the second voltage.

13. The wireless power transmission device of claim 9, wherein the first signal group and the second signal group are the square wave, a phase difference between the first switching signal and the fourth switching signal is 0 degrees or 360 degrees, and a phase difference between the second switching signal and the third switching signal is 0 degrees or 360 degrees.

14. The wireless power transmission device of claim 13, wherein a first voltage applied to the fourth node and a second voltage applied to the third node are square waves having the test frequency, and a phase difference between the first voltage and the second voltage is 180 degrees.

15. The wireless power transmission device of claim 14, wherein, when voltage levels of the first switching signal and the fourth switching signal are turn-off levels and voltage levels of the second switching signal and the third switching signal are turn-on levels, the voltage level of the first voltage is higher than the voltage level of the second voltage, and when voltage levels of the first switching signal and the fourth switching signal are turn-on levels and voltage levels of the second switching signal and the third switching signal are turn-off levels, the voltage level of the first voltage is lower than the voltage level of the second voltage.

16. An operating method of a wireless power transmitter for controlling a resonant tank, the method comprising:

setting a test frequency of a test signal applied to the resonant tank;

applying the test signal to the resonant tank to transmit wireless power;

sensing an input current generated directly from a power source, in response to the transmitted wireless power;

calculating a quality factor of the resonant tank based on the directly sensed input current;

comparing the quality factor with a reference quality factor; and resetting the test frequency or performing an operation of wirelessly transmitting power according to a result of comparing the quality factor with the reference quality factor.

17. The method of claim 16, wherein the setting of the test frequency comprises setting a frequency included in a stored frequency range as the test frequency, and the calculating of the quality factor of the resonant tank comprises:

sequentially applying a signal having the frequency as the test signal to the resonant tank, sequentially sensing input currents generated from the power source, and sequentially storing sensed values corresponding to the input currents;

setting a specified input current corresponding to a greatest value among the stored sensed values as a greatest input current, and setting the frequency as a test resonance frequency when the greatest input current is sensed;

calculating a bandwidth based on a cut-off frequency in response to sensing at least one input current corresponding to at least one sensed value 3 dB less than the greatest value among the stored sensed values; and calculating the quality factor using the test resonance frequency and the bandwidth.

18. The method of claim 16, wherein the setting of the test frequency comprises setting a stored initial frequency as the test frequency, and wherein the calculating of the quality factor of the resonant tank comprises:

applying a signal having the initial frequency as the test signal to the resonant tank, sensing a specified input current generated from the power source, and storing a sensed value corresponding to the specified input current;

calculating a change amount of the specified input current per unit time using the sensed value;

determining whether a sign of the change amount is changed;

repeating changing the initial frequency to store the sensed value and calculating the change amount until the sign is changed;

setting an input current corresponding to the stored sensed value as a greatest input current when the sign is changed, and setting a frequency as a test resonance frequency when the greatest input current is sensed;

calculating a bandwidth based on a cut-off frequency in response to sensing an input current corresponding to a sensed value 3 dB less than the stored sensed value, when the sign of the stored sensed values is changed; and calculating the quality factor using the test resonance frequency and the bandwidth.

19. The method of claim 16, wherein the setting of the test frequency comprises setting a specified resonance frequency as a first test frequency, and wherein the calculating of the quality factor of the resonant tank comprises:

applying a first test signal to the resonant tank, sensing a first input current generated from the power source, and storing a first sensed value corresponding to the first input current;

calculating a first cut-off frequency greater than the specified resonance frequency using a stored first bandwidth and the specified resonance frequency, and setting the first cut-off frequency as a second test frequency;

storing a second sensed value corresponding to a second input current sensed by applying a second test signal to the resonant tank;

comparing the first sensed value with the second sensed value; and repeating setting the test frequency, storing the first sensed value, setting the second test frequency and storing the second sensed value until the first sensed value is greater than or equal to the second sensed value.

20. The method of claim 19, wherein the calculating of the quality factor of the resonant tank comprises:

subtracting a frequency step of a stored positive number from a frequency when the first sensed value is greater than or equal to the second sensed value;

storing a sensed value corresponding to the sensed input current by applying a signal having a subtracted frequency to the resonant tank as the test frequency;

calculating a change amount of the sensed input current per unit time using the sensed value;

determining whether a sign of the change amount is changed;

repeating subtracting a positive frequency step, storing the sensed value, and calculating the change amount until the sign is changed;

setting an input current corresponding to the stored sensed values as a greatest input current when the sign is changed, and setting a frequency as a test resonance frequency when the greatest input current is sensed;

calculating a second bandwidth based on a second cut-off frequency in response to sensing an input current corresponding to a sensed value 3 dB less than the stored sensed value, when the sign of the stored sensed values is changed; and calculating the quality factor using the test resonance frequency and the second bandwidth.

* * * * *